United States Patent [19]
Tabanou et al.

[11] Patent Number: 5,461,562
[45] Date of Patent: Oct. 24, 1995

[54] METHOD AND APPARATUS FOR DETECTING AND QUANTIFYING HYDROCARBON BEARING LAMINATED RESERVOIRS ON A WORKSTATION

[75] Inventors: Jacques R. Tabanou, Houston, Tex.; J. N. Antoine, Vaux-Le-Penil, France

[73] Assignee: Schlumberger Technology Corporation, Houston, Tex.

[21] Appl. No.: 263,505

[22] Filed: Jun. 21, 1994

Related U.S. Application Data

[63] Continuation of Ser. No. 780,162, Oct. 21, 1991, abandoned.
[51] Int. Cl.$^6$ ............................. E21B 49/00; G06F 17/00
[52] U.S. Cl. .................................................. 364/422
[58] Field of Search ........................... 364/422; 73/151, 73/152; 324/323; 367/25

[56] References Cited

U.S. PATENT DOCUMENTS

| | | | |
|---|---|---|---|
| 3,166,709 | 1/1965 | Doll | 324/339 |
| 4,440,020 | 4/1984 | Boutemy et al. | 73/152 |
| 4,482,959 | 11/1984 | Minne | 364/422 |
| 4,484,278 | 11/1984 | Edmundson | 364/422 |
| 4,486,836 | 12/1984 | Lacour-Gayet | 364/422 |
| 4,535,625 | 8/1985 | Lyle, Jr. | 73/152 |
| 4,604,581 | 8/1986 | Thadani et al. | 324/339 |
| 4,646,240 | 2/1987 | Serra et al. | 364/422 |
| 4,648,268 | 3/1987 | Grosjean | 73/152 |
| 4,794,792 | 1/1989 | Flaum et al. | 73/152 |
| 4,873,488 | 10/1989 | Barber et al. | 324/339 |

OTHER PUBLICATIONS

Bilsland, M., Mobed, R. and Cheruvier, E., "Predicting Hydrocarbon Saturations in Thin Sandstones Drilled with Oil–Based Mud", SAID Paris, Oct. 24–25–26, 1989.
Brochure—"Become a Wizard of Well Log Interpretation", ELAN System by Schlumberger, date unknown.
Brochure—"Layered Reservoir Testing", Schlumberger, date unknown.
Brochure—"Formation Microscanner" (FMS), Schlumberger, Apr. 1986.
Brochure—"Rock Star"—Schlumberger's Geocolumn Service, Schlumberger, date unknown.

(List continued on next page.)

*Primary Examiner*—David M. Huntley
*Attorney, Agent, or Firm*—Henry N. Garrana; John H. Bouchard

[57] ABSTRACT

A new interpretation system receives a low resolution log and a high resolution log from a well logging tool that is disposed in a wellbore which traverses a highly laminated formation and generates an output record medium which clearly illustrates and quantifies each layer of the plurality of layers of the laminated formation. In response to receipt of the low and high resolution logs, the new interpretation system generates a rectangular deconvolved log. The rectangular deconvolved log is generated by first selecting a plurality of modes or possible formation types from a histogram. Each of the plurality of modes are then solved, in a least squares sense, by minimizing the sum, over a particular depth interval in the wellbore, of the square of the residual between the tool measurement and the reconstructed log, a calculation which is equivalent to solving a system of N equations and N unknowns. A basis function is determined for each mode, and the rectangular deconvolved log is defined to be the sum of the basis function for each mode multiplied by the calculated value of the associated mode derived from the solution of the N equations and N unknowns. The rectangular deconvolved log is subsequently convolved with a vertical response function of the well logging tool thereby producing a reconstructed log. The reconstructed log undergoes interactive refinement producing a refined rectangular deconvolved log. If no further refinement is needed, a volumetric analysis is performed on the refined rectangular deconvolved log to produce an output record medium which clearly illustrates and quantifies each layer of the plurality of layers of the laminated formation traversed by the wellbore.

12 Claims, 16 Drawing Sheets

Other Publications

Brochure—"Three Powerful Products to Help Solve Your Geological Puzzle"—Geocolumn, Syndip, Stratim, Schlumberger, date unknown.

Brochure—"Faciolog", Sclumberger, date unknown.

Brochure—"Faciolog—Computer Processed Electrofacies Analysis", dated Jun. 1982, Schlumberger.

Poupon, A., Log, M. E., and Tizier, M., "A Contribution to Electrical Log Intrepretation in Shaly Sands", Trans, AIME 1954 vol. 201, pp.138–145.

Allen, D. F., "Laminated Sand Analysis", SPWLA 25th Annual Logging Symposium, 1984, pp. 1–20.

Suau, J., et al., "Intrepretation of Very Thin Gas Sands in Italy", SPWLA 25th Symposium, 1984, pp. 1–22.

Barber, T., "Induction Vertical Resolution Enhancement–Physics and Limitations", Trans., 1988 SPWLA, San Antonio, pp. 1–18.

Galford, J. E., Flaum, C., Gilchrist, W. A. and Duckett, S. W., "Enhanced Resolution Processing of Compensated Neutron Logs", paper SPE 15541, 1986, New Orleans, pp. 1–18.

Flaum, C. and Galford, J. E., "Enhanced Vertical Resolution Processing of Dual Detector Gamma-Gamma Density Logs", SPWLA 1987, 28th Annual Logging Symposium, pp. 1–25.

Quirein, J., Kimminau, S., LaVigne, J. and Wendel, F., "A Coherent Framework for Developing and Applying Multiple Formation Evaluation Models", SPWLA, date unknown.

Mayer, C. and Sibbit, A., "Global, A New Approach to Computer–Processed Log Intrepretation", paper SPE 9341, 1980, pp. 1–20.

Ekstrom, M. P., Dahan, D., Rossi, D., "Formation Imaging with Microelectrical Scanning Arrays", Log Analyst, No. 3, pp. 294–306, Jun. 1987.

Trouiller, J. C. and Delhomme, J. P., "Thin–Bed Reservoir Analysis from Borehole Electrical Images", paper SPE 19578, Oct. 1989.

Andreani, M., "Quantitative Evaluation of Highly Laminated, Complex Lithology Formations", paper SPE 17944, Mar. 1989.

Wolff, M. and Pelissier–Combescure, J., "Faciolog—Automatic Electrofacies Determination", paper SPE 1982, pp. 1–23.

Delfiner, P. C., Peyret, O. and Serra, O., "Automatic Determination of Lithology from Well Logs", paper SPE 13290, 1984, pp. 1–7.

Barber, T., "Introduction to the Phasor Dual Induction Tool", JPT, 1985, Sep., pp. 1699–1706.

Freedman, R. and Minerbo, G., "Maximum Entropy Inversion of Induction–Log Data", paper SPE Formation Evaluation, Jun. 1991, pp. 259–268.

METHOD AND APPARATUS FOR DETECTING AND QUANTIFYING HYDROCARBON BEARING LAMINATED RESERVOIRS ON A WORKSTATION

This is a continuation of application Ser. No. 07/780,162 filed Oct. 21, 1991, now abandoned.

BACKGROUND OF THE INVENTION

The subject matter of the present invention relates to a new method and apparatus for performing an interactive formation evaluation of laminated reservoirs on a workstation, and more particularly, to a new method and apparatus for defining more accurately layer boundaries of a highly laminated reservoir traversed by a wellbore and for providing a more accurate quantitative petrophysics evaluation of a highly laminated reservoir.

When a well logging tool is disposed in a wellbore, it measures the properties of a formation traversed by the wellbore and generates output signals representative of these properties, the output signals being transmitted uphole to a well logging truck situated at the wellbore surface and printed or recorded in the form of output record logs on an output record medium. These logs are subsequently input into a separate workstation where they are analyzed by interpretation software for the purpose of determining the specific properties of the formation, that is, whether the formation consists of oil, water, gas, quartz, sand, etc. For example, the interpretation software responds to the receipt of the output record logs by performing a volumetric analysis on such logs. When a volumetric analysis is performed, volumes $V_j$ are determined, such volumes further determining the amount of oil, water, gas, quartz, sand, etc present in the formation at the different depths of the wellbore. One such interpretation software which performs a volumetric analysis is known as Expert Log Analysis (ELAN). Equation 3 set forth in the Detailed Description of the Preferred Embodiment below represents a classical ELAN equation of formation evaluation wherein such volumes are calculated. Although the ELAN software performs its interpretation function well when the logging tool is disposed in most wellbores, when the logging tool is disposed in a highly laminated wellbore (one where the formation traversed by the wellbore consists of a multitude of layers of different materials), the ELAN software fails to record sufficiently an interface between the end of one layer of material at a particular depth of the laminated wellbore and the beginning of another layer of material at said depth. In fact, ELAN fails to distinguish and adequately record, on the output record medium, the multitude of interfaces which exist along a laminated wellbore. In addition, the ELAN software often fails to accurately record, on the output record medium, the volumes of oil, water, etc, which exist in the laminated formation at different depths in the wellbore.

Evaluation of thinly laminated reservoirs is not a new problem in formation evaluation and interpretation. See, for example, U.S. Pat. No. 3,166,709 entitled "Method and Apparatus for providing Improved Vertical Resolution in Induction Well Logging, including Electrical Storage and Delay Means" issued in 1965, the disclosure of which is incorporated by reference into this specification. Another element brought up early in the interpretation of laminated reservoirs is the notion of Model. In an article entitled "A Contribution to Electrical Log Interpretation in Shaly Sands" by Poupon A., Loy M. E., and Tixier M., Trans. AIME 1945 Vol 201, 138, 145, A Poupon et al were the first to assume a laminated conductivity model for estimating the bulk conductivity (1/Rt) probed by Deep Induction and then trying to minimize the difference between real and computed formation conductivity. Three pieces of information were necessary to compute Rt in sand: first, the detection of the sand laminations with a high resolution log (the Microlog); second, the assumption that the shale laminations had a constant conductivity equal to the surrounding massive shale; and third, the computed bulk conductivity, obtained by convolving the conductivity model with the Induction "Geometrical Factor Map". Therefore, from the beginning, it was clear that the resolution of Rt is one of the main limitations in estimating water saturation with standard open hole logs. To succeed, any thin bed interpretation method requires: (1) at least one high resolution measurement, (2) a model and some petrophysical assumptions, (3) the means to compute or "reconstruct" the tool measurement, given the assumed model.

In the Laminated Sand Analysis (LSA) developed by D. Allen (see "Laminated Sand Analysis" D. F. Allen, SPWLA 25th Annual Logging Symposium, 1984) for shaly sand reservoirs drilled with fresh or oil base mud (see "Predicting Hydrocarbon Saturations in Thin Sandstones drilled with oil-based mud" M. Bilsland, R. Mobed, E. Cheruvier, SAID Paris, Oct. 24-25-26, 1989), Rt is obtained from a Dual Induction. Electromagnetic wave Propagation (EPT) attenuation provides the high resolution information necessary to detect the laminations but also to discriminate between them. Indeed, when the conductivity of the invading fluid is low and much smaller than the conductivity of the shale bound water, EPT attenuation is approximately a linear function of the volume of conductive water within the flushed zone. EPT attenuation is therefore used to estimate the amount of bound water in the shale at a high resolution scale. Finally, the Deep Induction measurement is reconstructed by convolving its vertical response function with the proper vertical sequence of sand and shale laminations. Porosity, which enters into Archie's bulk conductivity equation, is derived from a Density Neutron porosity measurement. An apparent deep fluid conductivity can therefore be estimated versus depth which should lie between the conductivity of a wet clean sand and a 100% shale. The interpreter can modify model parameters to adjust the discrimination between sand and shale.

An alternative method was developed by J. Suau et al (see "Interpretation of Very Thin Gas SAnds in Italy" Suau J. et al, SPWLA 25th Symposium, 1984) which made use of pattern recognition and correlations computed between EPT, Neutron, Density, and Sonic logs to evaluate tight gas sands.

Several techniques have been developed to enhance a low resolution measurement by combining it with another measurement which has a much better vertical resolution but has generally a smaller depth of investigation. The best results have been obtained when the two measurements are measuring the same physical parameters. For example, the enhanced Phasor Deep Induction (see "Induction Log Vertical Resolution Enhancement-Physics and Limitations" Barber T., Trans., 1988 SPWLA, San Antonio) achieves higher vertical resolution by processing the standard Medium Phasor Induction to enhance the standard Deep Phasor Induction. High frequency information derived from the Medium is combined with the Deep phasor. In the case of the Neutron log (see "Enhanced Resolution Processing of Compensated Neutron Logs" Galford J. E., Flaum C., Gilchrist W. A., and Duckett S. W., paper SPE 15441, 1986 SPE, New Orleans) or the Density Log (see "Enhanced Vertical Resolution Processing of Dual Detector Gamma- Gamma Density Logs" Flaum C., Galford J. E., SPWLA 1987, 28th Annual Logging Symposium), this approach, known as "alpha processing", is performed in two steps. First, the high resolution measurement is low-pass filtered to yield a spectrum which matches the low resolution one. This produces a gain and offset on the high frequency measurement. Second, the enhanced high resolution output is computed as the sum of the low resolution log and the difference between the normalized high resolution measurement and the matched version of the original low resolution log.

SUMMARY OF THE INVENTION

Accordingly, it is a primary object of the present invention to provide a new interpretation method and apparatus for producing an output record medium which clearly illustrates each layer associated with a plurality of layers of a laminated formation traversed by a wellbore, the output record medium quantifying each layer of the plurality of layers by providing the conductivity, resistivity, or other such parameter of each layer.

It is a further object of the present invention to provide the new interpretation method and apparatus for producing an output record medium which clearly illustrates and quantifies each layer of a plurality of layers of a laminated formation traversed by a wellbore, the new interpretation method and apparatus receiving a low resolution log and a high resolution log from a well logging tool disposed in the wellbore and generating in response thereto a new refined rectangular deconvolved log which, after undergoing volumetric analysis, produces an output record medium which clearly illustrates and quantifies each layer of the plurality of layers of the laminated formation.

It is a further object of the present invention to provide the new interpretation method and apparatus for producing an output record medium which clearly illustrates and quantifies each layer of a plurality of layers of a laminated formation traversed by a wellbore, the new interpretation method and apparatus receiving a low resolution log and a high resolution log from a well logging tool disposed in the wellbore and generating in response thereto a rectangular deconvolved log which is subsequently convolved with a vertical response function of the well tool thereby producing a new reconstructed log, the new reconstructed log undergoing interactive refinement and producing a new refined rectangular deconvolved log which, after undergoing volumetric analysis, produces an output record medium which clearly illustrates and quantifies each layer of the plurality of layers of the laminated formation.

These and other objects of the present invention are accomplished by providing a new interpretation system adapted for use on a workstation which receives a low resolution log and a high resolution log from a well logging tool that is disposed in a wellbore which traverses a highly laminated formation and generates in response thereto a rectangular deconvolved log. The rectangular deconvolved log is generated by first selecting a plurality of modes or possible formation types from a histogram. Each of the plurality of modes are then solved, in a least squares sense, by minimizing the sum, over a particular depth interval in the wellbore, of the square of the residual between the tool measurement and the reconstructed log, a calculation which is equivalent to solving a system of N equations and N unknowns, where N is the number of the plurality of modes selected from the histogram. A basis function is determined for each mode, and the rectangular deconvolved log is defined to be the sum of the basis function for each mode multiplied by the calculated value of the associated mode (derived from the solution of the N equations and N unknowns). The rectangular deconvolved log is subsequently convolved with a vertical response function of the well logging tool thereby producing a reconstructed log. The reconstructed log is refined via an interactive refinement procedure implemented by an operator at the workstation thereby producing a refined rectangular deconvolved log. A volumetric analysis is performed on the refined rectangular deconvolved log to produce an output record medium which clearly illustrates and quantifies each layer of the plurality of layers of the laminated formation traversed by the wellbore.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DESCRIPTION OF THE PREFERRED EMBODIMENT

Figure 1:
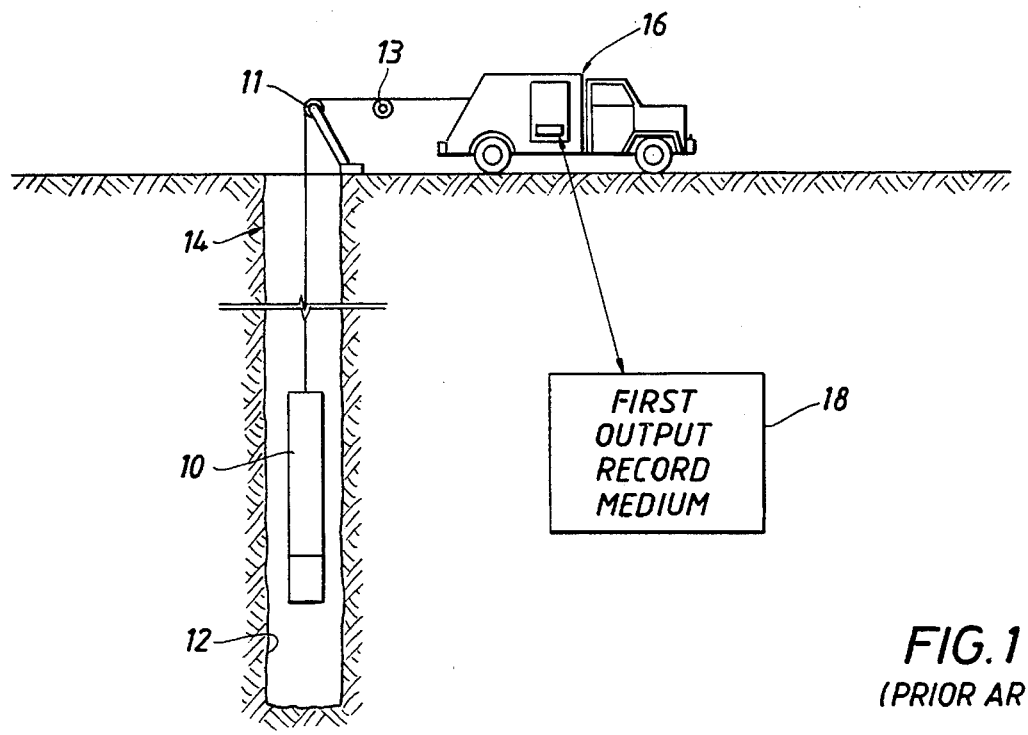
FIG. 1 illustrates a well logging tool disposed in a wellbore which traverses a laminated formation for generating output signals indicative of a characteristic of the laminated formation, and a well truck containing a computer for recording the output signals in the form of logs on a first output record medium.

Referring to FIG. 1, a well logging truck situated at the surface of a wellbore is illustrated. In FIG. 1, a well logging tool 10 is disposed in a wellbore 12 which traverses a laminated formation 14. Since the formation 14 is laminated, it comprises a multitude of layers, one on the other, some layers being thicker in depth than others. In addition, some layers are comprised of a material (and fluid) which is different than the material of other layers. The well logging tool 10 transmits energy into the formation 14, and receives the energy from the formation thereby generating output signals which are transmitted uphole, in the form of logs, to a well logging truck situated at the wellbore surface wherein a computer 16 is located. The computer 16 may be any typical computer, such as one of the following computer systems manufactured by the Digital Equipment Corporation (DEC), Maynard, Mass.: (1) DEC VAX 6430, (2) DEC PDP-11, or (3) DEC Vaxstation 3100. The computer 16 records the logs on a first output record medium 18. The first output record medium 18 could be a computer printout, or it could be a magnetic tape or other form of recording medium for storing or recording the logs therein. The logs printed or recorded on the first output record medium 18 represent characteristic properties of the laminated formation, such as conductivity or resistivity.

Figure 2:
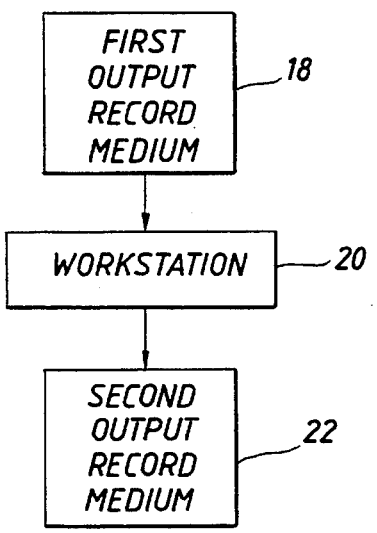
FIG. 2 illustrates a workstation which receives the first output record medium.

Referring to FIG. 2, the first output record medium 18 may be subsequently removed from the well logging truck; the logs recorded or stored on the medium 18 are re-stored in a workstation 20 wherein they are interpreted, by interactive interpretation software. The interpretation software, when executed by the workstation 20 processor, determines the type of material (such as quartz, water, gas, oil, etc) which comprises each layer of the multitude of layers of the laminated formation 14. One such piece of interpretation software (known as Expert Log Analysis or ELAN) performs a volumetric analysis on the logs. A volumetric analysis attempts to determine, by calculating certain volumes $V_j$, the type of material and fluids which comprise each layer of the multitude of layers of the laminated formation, and a second output record medium 22 is generated which records or stores the type of material or fluids associated with each layer of the laminated formation. Equation 3 set forth below in the Detailed Description of the Preferred Embodiment represents the classical ELAN equation of formation evaluation; in equation 3, the volumes $V_j$ can be computed by solving the equation. The volumetric analysis service, performed by the ELAN interpretation software, may be obtained by contacting Schlumberger Technology Corporation, P.O. Box 2175, Houston, Tex. 77252–2175.

Figure 3:
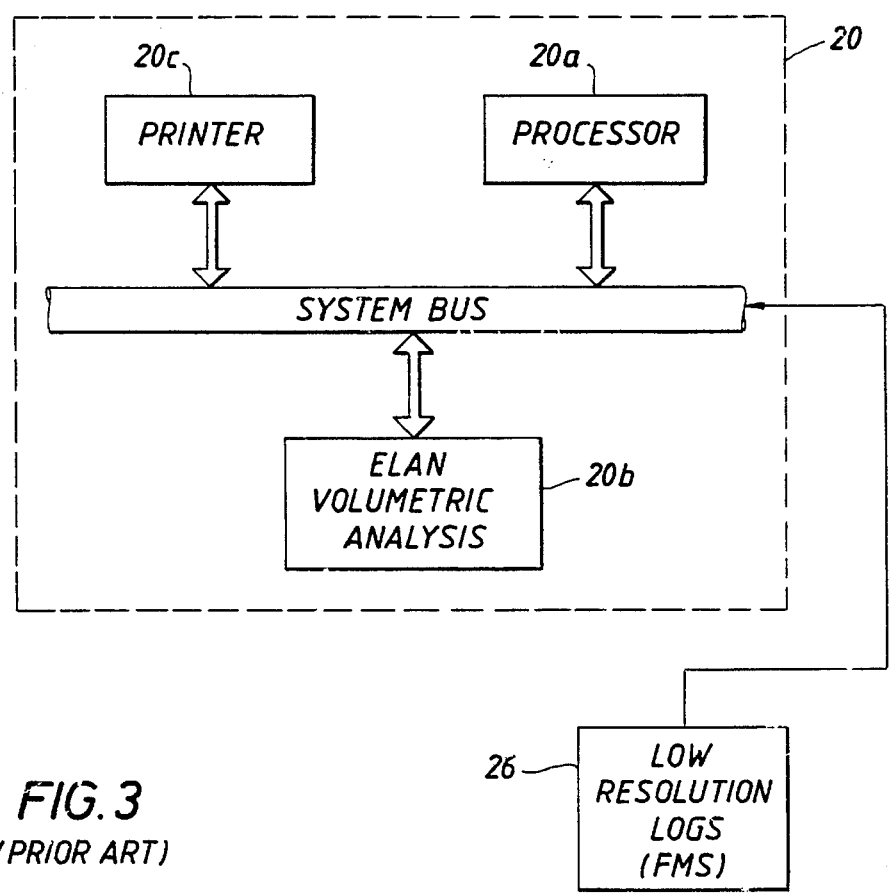
FIG. 3 illustrates a more detailed construction of the workstation of FIG. 2, the workstation storing a prior art ELAN software for performing a volumetric analysis on the logs.

Referring to FIG. 3, a construction of a typical prior art workstation 20 is illustrated. The workstation 20 may be any typical workstation, such as a SUN "SPARC 2" workstation used in connection with the preferred embodiment. The workstation 20 may comprise a processor 20a, a memory 20b which stores the ELAN interpretation software for performing a volumetric analysis on the logs generated by the computer 16 when the ELAN software is executed by the processor 20a, and a printer 20c which prints the second output record medium 22. In operation, a low resolution log 26 (such as the low resolution log generated by the low resolution Phasor Induction or Density tools) is normally input to the workstation 20. The processor 20a executes the ELAN interpretation software stored in memory 20b and performs a volumetric analysis on the low resolution logs 26. The second output record medium 22 is printed by the printer 20c which attempts to indicate the type of material and fluids which comprise each layer of the laminated formation 14.

Figure 4:
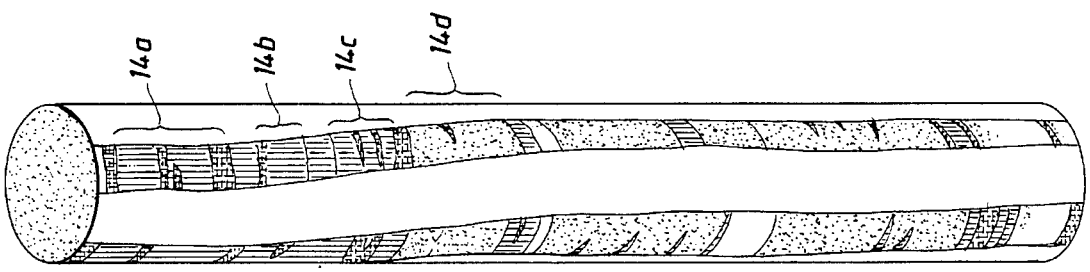

Referring to FIG. 4, the layering of materials typically found in a laminated formation 14 is illustrated. This layering is illustrated as it would appear on a typical core photograph of a laminated formation.

Figure 5:
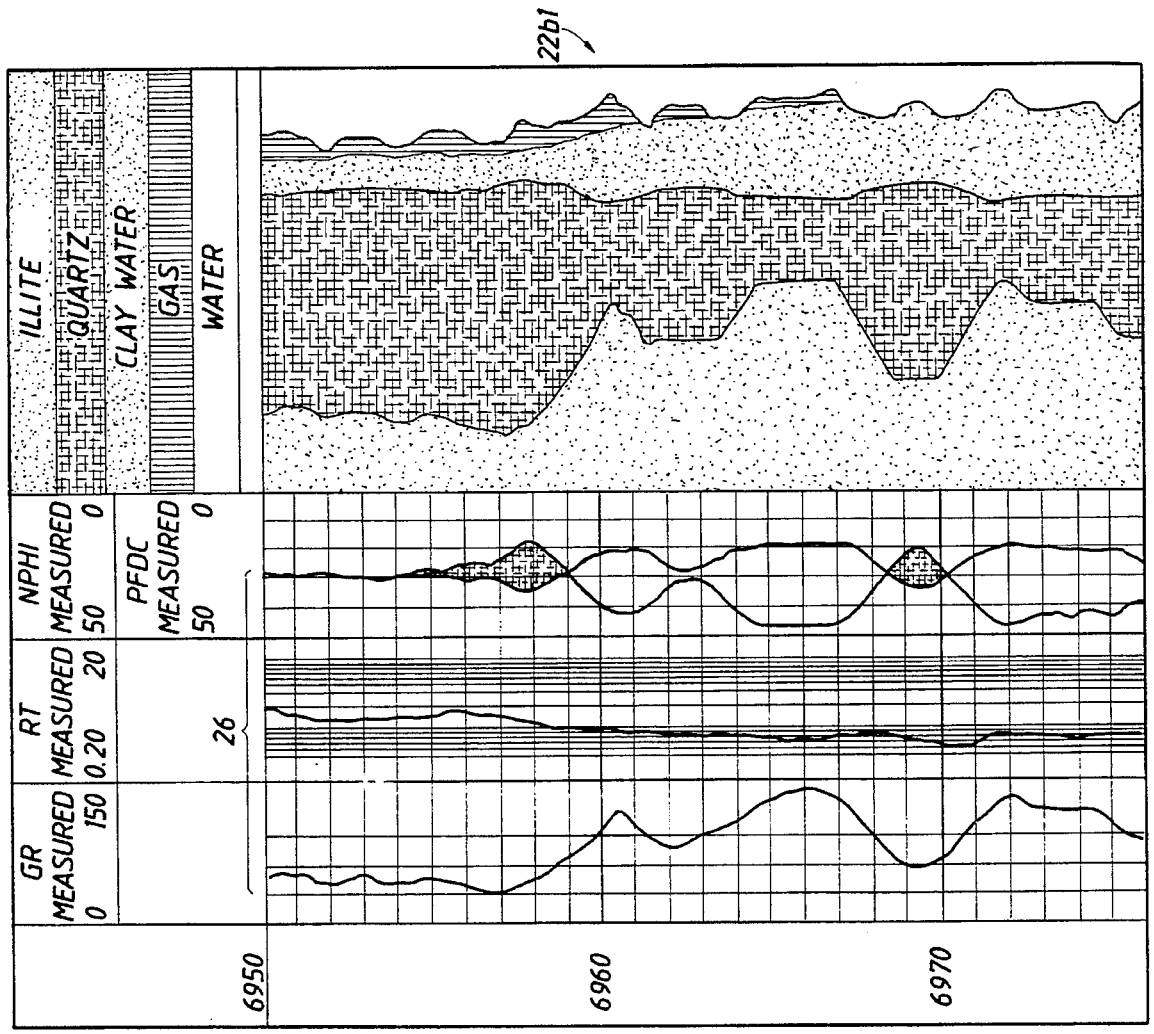
FIGS. 4–5 illustrate a section of a wellbore traversing a laminated formation, a plurality of prior art low resolution logs taken by the well truck computer of FIG. 1 representing characteristics of the laminated formation, and a prior art volumetric analysis, performed by the ELAN software of FIG. 3 on the plurality of low resolution logs.

Referring to FIG. 5, the precise information which is printed on the second output record medium 22 of FIG. 2 when using the workstation 20 of FIG. 3 is illustrated.

In FIG. 4, a section of the laminated formation 14 traversed by the wellbore 12, as seen by a high resolution logging tool known as the Formation Micro Scanner (FMS), is illustrated. This section of the formation 14 includes a multitude of "shale" laminations interleaved with "sand" laminations extending from top to bottom of FIG. 4 along the depth of the wellbore, the multitude of shale laminations including a first shale lamination layer 14a, a second shale lamination layer 14b, a third shale lamination layer 14c, a fourth shale lamination layer 14d, etc. The sand lamination layers are the areas which are interleaved with the shale lamination layers 14a–14d.

In FIG. 5, the second output record medium 22 includes a plurality of low resolution logs 26 and a volumetric analysis 22b1 of the low resolution logs 26, the volumetric analysis 22b1 being performed on the low resolution logs 26 when the ELAN software stored in memory 20b of FIG. 3 is executed by the processor 20a of workstation 20 of FIG. 3.

At this point, one problem associated with the prior art interpretation technique discussed above with reference to FIGS. 1–5 becomes clear. Although the formation 14 is highly laminated, as indicated by laminations 14a through 14d of FIG. 4, when the well logging tool 10 traverses the depth of the wellbore 12, and passes a plurality of interfaces disposed between adjacent lamination layers 14a and 14b of FIG. 4, the volumetric analysis 22b1 of FIG. 5 fails to clearly indicate the presence of these interfaces. This interpretation is an illustration of how hydrocarbon zones can be overlooked and possibly bypassed as uneconomical. The interpretation does not identify the producing intervals with sufficient precision. Relative permeability to hydrocarbon derived from logs, which is a function of water saturation, would not be accurate either. Perforating the entire interval could yield unwanted and costly water production. Therefore, when the well logging tool 10 is disposed in a wellbore which traverses a highly laminated formation 14, a different interpretation method and apparatus is needed, one which clearly indicates, in a volumetric analysis, similar to that shown in FIG. 5, the presence of a multitude of interfaces between a multitude of lamination layers similar to lamination layers 14a through 14d of FIG. 4.

Figure 6:
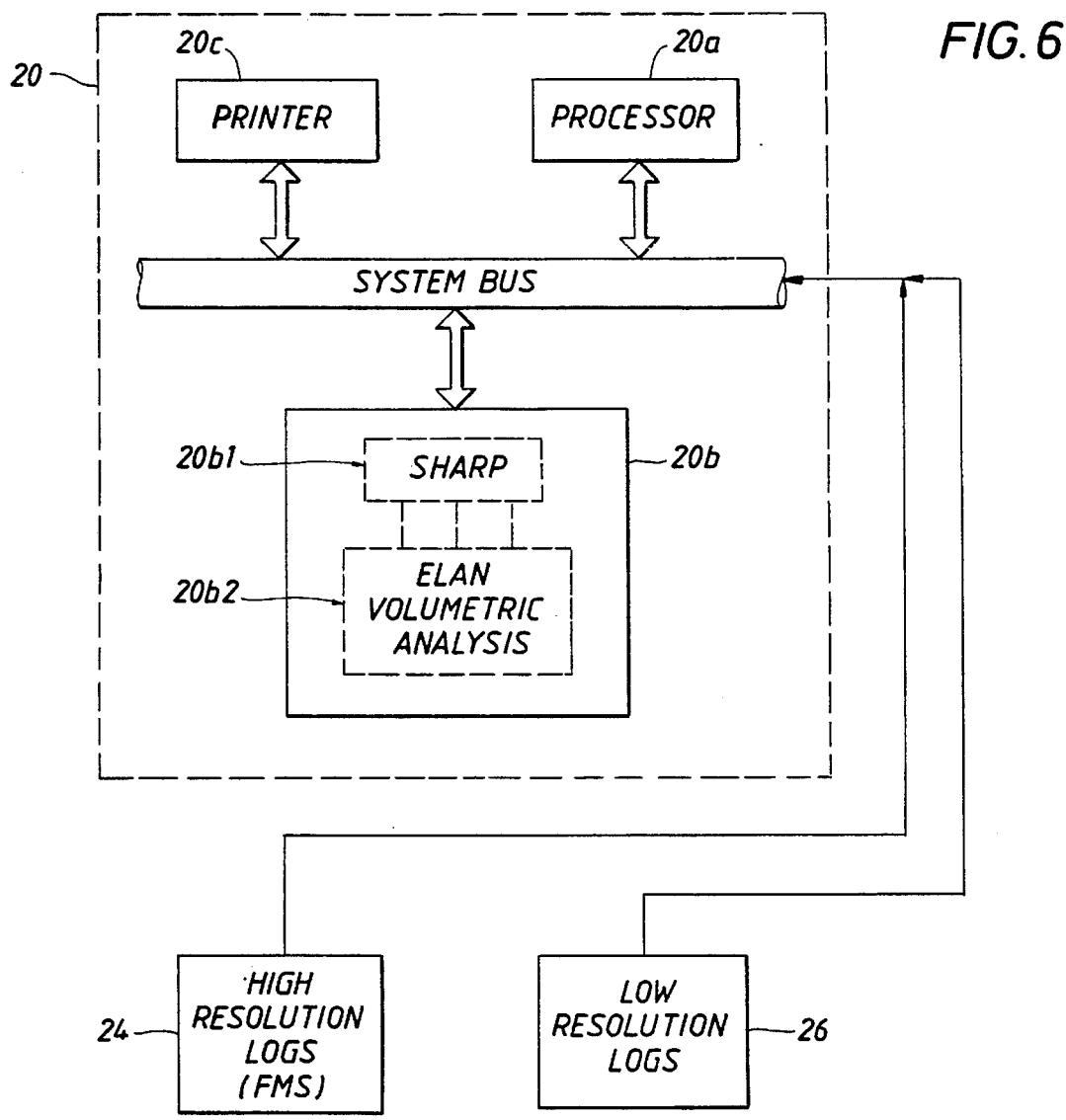
FIG. 6 illustrates another more detailed construction of the workstation of FIG. 2, this workstation storing a new interpretation software in accordance with the present invention, which new interpretation software is termed "Synergetic High Resolution Analysis and Reconstruction for Petrophysics Evaluation (SHARP)"

Referring to FIG. 6, another more detailed construction of the workstation 20 of FIG. 2 is illustrated, this workstation 20 storing a new interpretation software in accordance with the present invention, the new interpretation software being termed "Synergetic High Resolution Analysis and Reconstruction for Petrophysics Evaluation (SHARP)".

In FIG. 6, the workstation 20 includes the processor 20a connected to a system bus, a printer 20c connected to the system bus for generating the second output record medium 22, and a memory 20b connected to the system bus, the memory 20b storing the SHARP software 20b1 in accordance with the present invention, and the Expert Log Analysis (ELAN) interpretation software 20b2. Two types of logs are input to the workstation 20 of FIG. 6: a high resolution log 24, such as the log produced by a high resolution tool known as the Formation Micro Scanner (FMS), and the low resolution log 26, such as a low resolution log produced by the Phasor Induction or Density tools. In operation, the processor 20a of the workstation of FIG. 6 responds to the high resolution logs 24 and the low resolution logs 26 by first executing the SHARP software 20b1 and then executing the ELAN interpretation software 20b2. A further more detailed description of the SHARP software 20b1 and a functional description of the operation of workstation 20 of FIG. 6 when executing the SHARP software 20b1 and ELAN software 20b2 will be discussed later in this specification.

Figure 7:
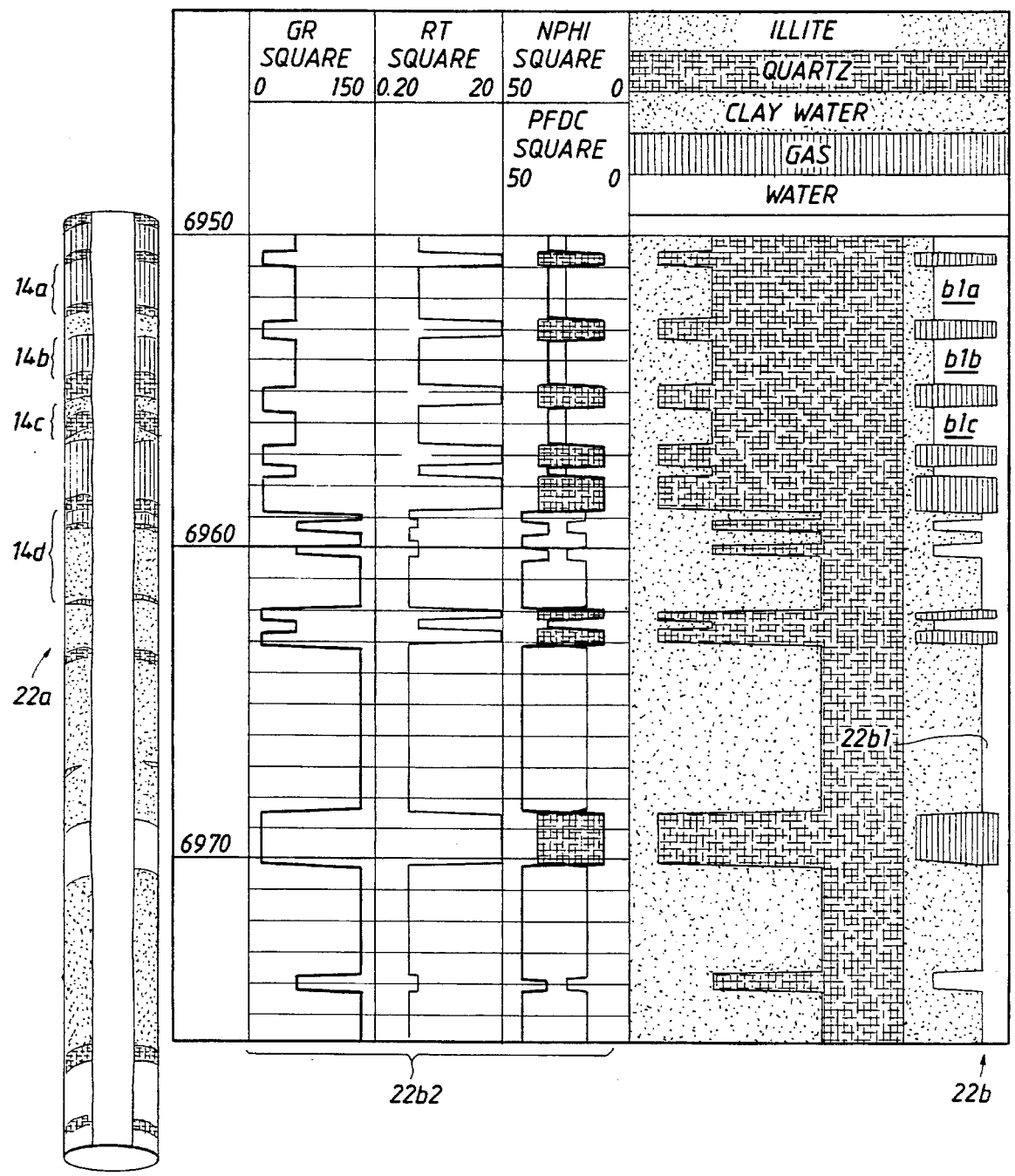
FIG. 7 illustrates the same section of wellbore of FIG. 4 which traverses the laminated formation, a plurality of refined rectangular deconvolved logs, and a new volumetric analysis, performed by the ELAN software, on refined rectangular deconvolved logs, produced by the new SHARP interpretation software in accordance with the present invention, this volumetric analysis illustrating each layer of the plurality of layers of the laminated formation.

Referring to FIG. 7, the precise information which is printed on the second output record medium 22 of FIG. 2 when using the workstation 20 of FIG. 6 and the new SHARP interpretation software 20b1 in accordance with the present invention is illustrated. FIG. 7 illustrates the same section of wellbore of FIG. 4 which traverses the laminated formation, a plurality of rectangular deconvolved logs 22b2, "squared" versions of the prior art high resolution logs 24 logs of FIG. 5, and a new volumetric analysis 22b1 performed by the ELAN software 20b2 on refined rectangular deconvolved logs produced by the new SHARP interpretation software 20b1 in accordance with the present invention, this volumetric analysis 22b1 illustrating each layer of the plurality of lamination layers of the laminated formation 14.

In FIG. 7, a first part 22a of the second output record medium 22 illustrates a section of the laminated formation 14 traversed by the wellbore 12 as seen by a high resolution logging tool known as the Formation Micro Scanner (FMS). This section of the formation 14 also includes a multitude of shale laminations interleaved with sand laminations including a first shale lamination layer 14a, a second shale lamination layer 14b, a third shale lamination layer 14c, a fourth shale lamination layer 14d, etc. A second part 22b of the second output record medium 22 includes a plurality of rectangular deconvolved logs 22b2, "squared" versions of the high resolution logs 24 of FIG. 5, and a volumetric analysis 22b1 of refined versions of the rectangular deconvolved logs 22b2, the volumetric analysis 22b1 being performed on the refined versions of the rectangular deconvolved logs 22b2 when the SHARP software 20b1 stored in memory 20b of FIG. 6 is first executed by processor 20a, and the ELAN software 20b2, also stored in memory 20b of FIG. 6, is subsequently executed by the processor 20a. With regard to the volumetric analysis 22b1 of FIG. 7, note in particular the well defined lithologic transition or lamination intervals b1a, b1b, b1c, etc, which detect and quantify the shale lamination layers 14a, 14b, and 14c in the laminated formation 14 traversed by the wellbore 12. By contrast, the prior art volumetric analysis 22b1 in FIG. 5 possessed no such well defined lithologic transition or lamination intervals. Therefore, the addition of the SHARP software 20b1 in memory 20b of FIG. 6 has improved substantially the quality and quantity of information presented on the second output record medium 22 shown in FIG. 7 which is generated by the workstation 20 of FIG. 6.

Figure 8:
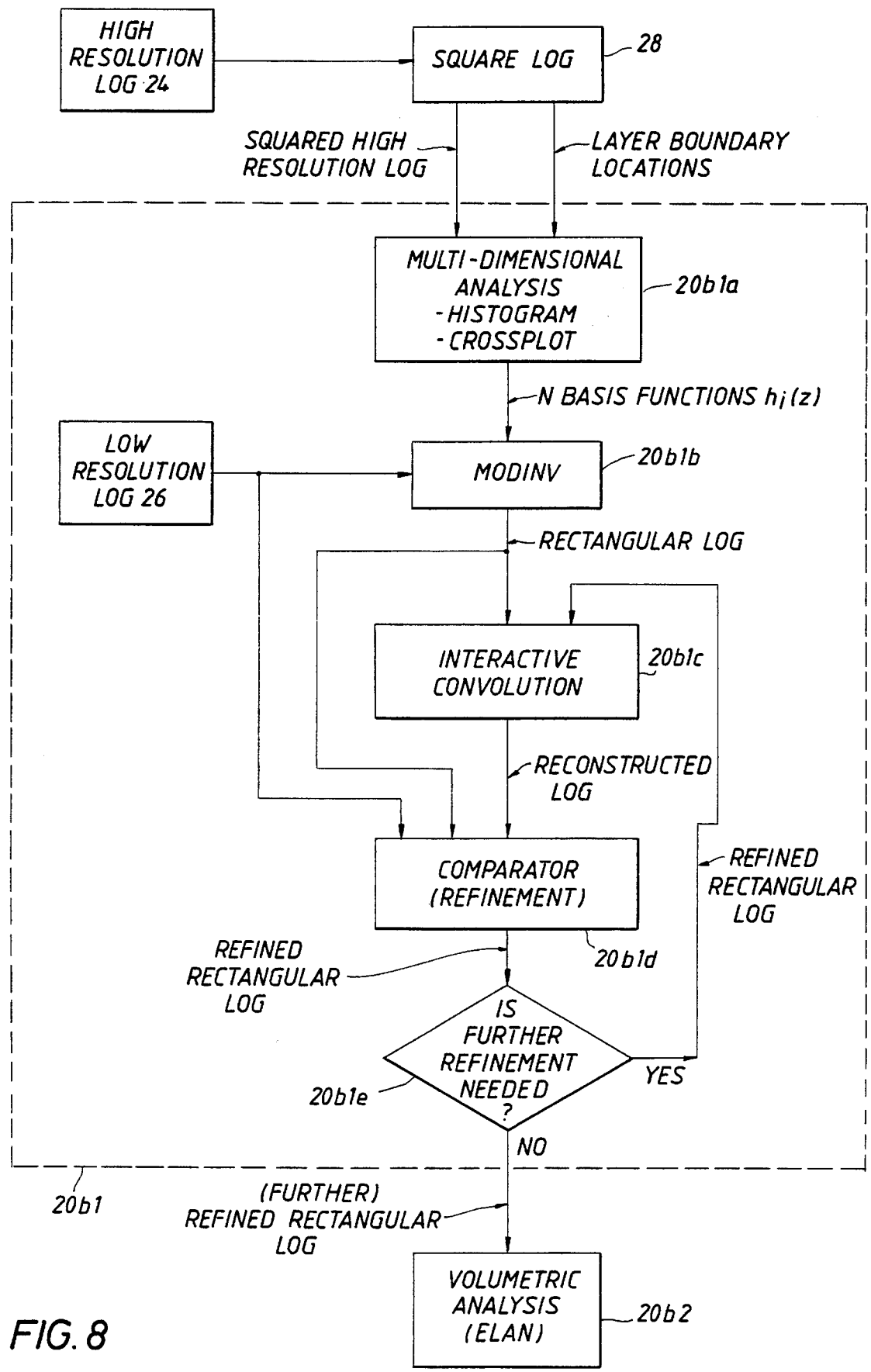
FIG. 8 illustrates a detailed block diagram of the new SHARP interpretation software in accordance with the present invention.

Referring to FIG. 8, a detailed construction of the SHARP software 20b1 of FIG. 6 is illustrated.

In FIG. 8, the SHARP software 20b1 includes a multidimensional analysis-histogram-crossplot block 20b1a (hereinafter called "MD-analysis 20b1a"). The MD-analysis 20b1a block is responsive to an output of a square log block 28. The square log block 28 receives the high resolution logs 24 generated by a high resolution well logging tool, such as the Formation Micro Scanner (FMS), detects boundary locations between adjacent lamination layers in the laminated wellbore, and generates a squared version of the high resolution log 24. This represents only one method for detecting boundary locations; the knowledge of the precise depth at which local dips have been determined by processing FMS images being the other method; these local dips are generated by FMSDIP/EPS software for FMS processing, a product or service available from Schlumberger Technology Corporation, P.O. Box 2175, Houston, Tex. 77252. The square log block 28 detects significant inflection points on a high resolution input log, these inflection points being interpreted as bed boundaries which are used to construct the squared version of the high resolution log 24. The MD-Analysis block 20b1a determines natural cutoff locations between areas or modes on a histogram or crossplot and uses these cutoff locations to ultimately determine a set of N basis functions $hi(z)$, a concept which will be more fully described in the functional operation of the present invention set forth later in this specification. A mode inverse (MODINV) block 20b1b receives the N basis functions $hi(z)$ from the MD-Analysis block 20b1a and receives a set of low resolution logs 26 (such as Phasor Induction or Density logs) and generates a rectangular deconvolved log "$S(z)$" in response thereto, the rectangular deconvolved log $S(z)$ being represented by equation 10 set forth in the detailed description of the preferred embodiment below. Equation 10 indicates that:

$$S(z_j) = \text{SUMMATION } [hn(z_j)Sn],$$

where $S(z_j)$ is the rectangular deconvolved log, $hn(z_j)$ are the basis functions $hi(z)$ and $Sn$ are a set of modes which are calculated using equations 13, 20, and 21. This concept will be more fully understood during a reading the functional operation of present invention set forth below. An interactive convolution block 20b1c responds to the rectangular deconvolved logs generated by the MODINV block 20b1b and generates a reconstructed log "r(z)" set forth in equation 5 in the detailed description of the preferred embodiment below. Recalling that a well logging tool is disposed in a wellbore for generating high and low resolution logs, the reconstructed log r(z) is defined by equation 5 to be the convolution of a vertical response function "g(zi-zj)", which characterizes the well logging tool (a known quantity), with the rectangular deconvolved log $S(z_j)$. A comparator block 20b1d receives the three logs, which consist of the reconstructed logs r(z), the rectangular deconvolved logs S(z), and the low resolution logs 26; all three logs are displayed on the workstation 20 display whereby the operator at the workstation 20 is able to perform a visual comparison of the three logs, as indicated by the comparator block 20b1d. During the visual comparision, the operator improves the match between the input low resolution logs 26 and the reconstructed logs output from the interactive convolution block 20b1c; he modifies or refines the rectangular deconvolved logs S(z) and generates a new refined rectangular deconvolved log. A decision block 20b1e asks "is further refinement needed?". If no further refinement is necessary, the refined rectangular deconvolved log undergoes volumetric analysis as indicated below; however, if further refinement is necessary, the refined rectangular deconvolved log is input to the interactive convolution block 20b1c where the above process of convolution using equation 5 is implemented and a visual comparision (refinement) in the comparator block 20b1d produces a further refined rectangular deconvolved log. If no further refinement was necessary, a volumetric analysis block 20b2 performs a volumetric analysis on the refined rectangular deconvolved log, using the ELAN software 20b2. As noted earlier, the ELAN software 20b2 is a prior art software block which calculates certain volumes $V_j$; that is, it performs a volumetric analysis on the refined rectangular deconvolved log. Equation 3 set forth in the Detailed Description of the Preferred Embodiment below represents the classical ELAN equation of formation evaluation wherein the volumes $V_j$ can be computed. The volumetric analysis service performed by ELAN is available through Schlumberger Technology Corporation, P.O. Box 2175, Houston, Tex. 77252.

Figure 9:
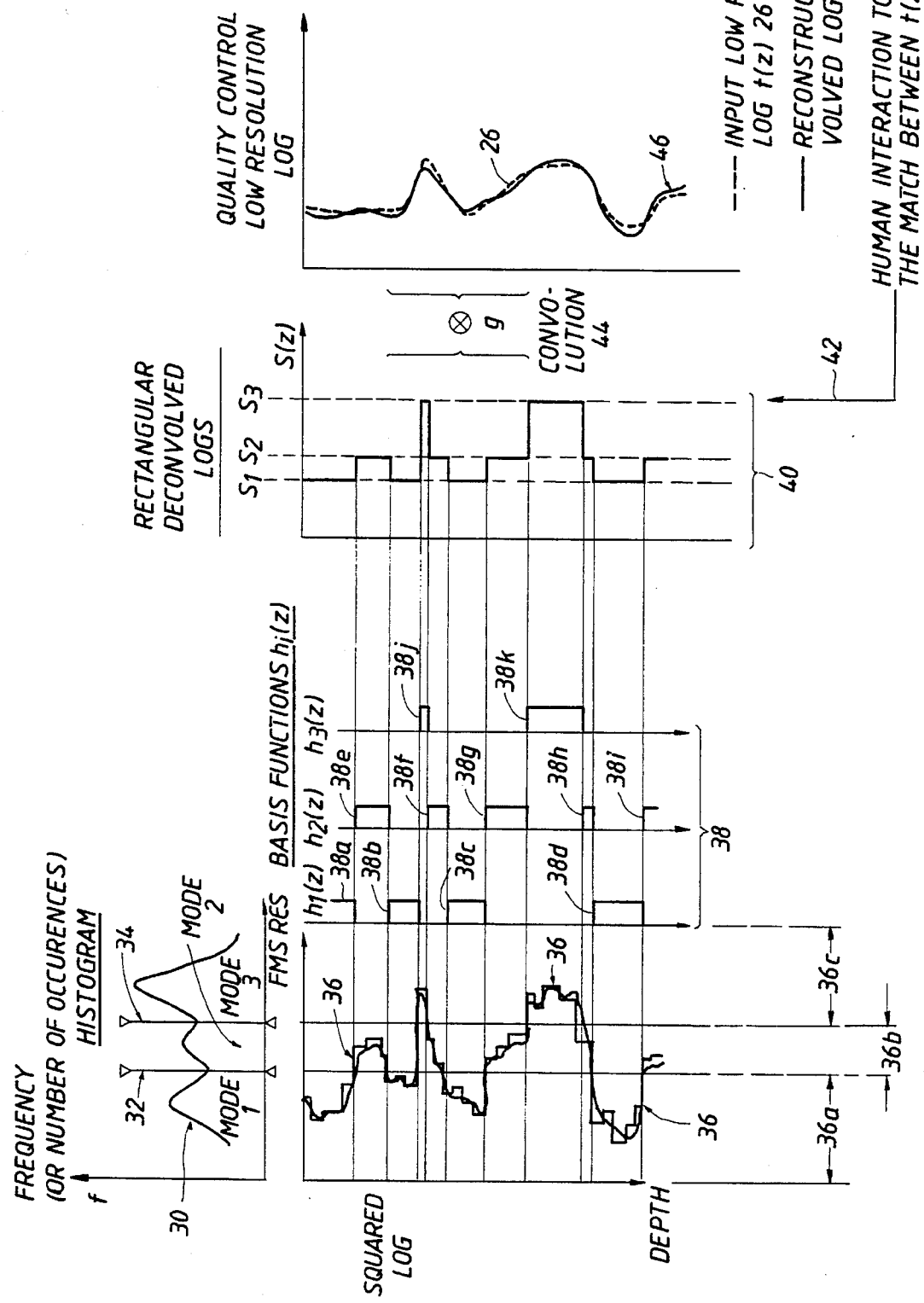
FIG. 9 illustrates the functional operation of the SHARP interpretation software of the present invention.

Referring to FIG. 9, a histogram 30 has been divided into three modes, mode 1, mode 2, and mode 3, by cutoff location 32 and cutoff location 34. Mode 1 exists to the left of cutoff location 32, mode 2 exists between cutoff location 32 and cutoff location 34, and mode 3 exists to the right of cutoff location 34. The histogram is a plot of frequency of occurance on the y-axis and resistivity of the laminated formation 14 on the x-axis as determined by the high resolution log 24 developed from the FMS high resolution well logging tool. The x-axis of the histogram 30 could represent other parameters of formation 14, such as conductivity. A squared version 36 of a high resolution log 24 (hereinafter called squared log 36) developed by the square log block 28 of FIG. 8 appears below the histogram 30. Three basis functions hi(z) 38 appear to the right of the squared log 36. In FIG. 8, reference was made to the "N basis functions hi(z)". In FIG. 9, since there are three modes (mode 1, mode 2, mode 3 as determined by the two cutoff locations 32 and 34), then N=3 in our example. A rectangular deconvolved log 40 appears to the right of the basis functions 38. The rectangular deconvolved log 40 undergoes convolution with the vertical response function 44 of the well logging tool (a known quantity) via the interactive convolution block 20b1c thereby producing a reconstructed log 46. As indicated by arrow 42, the reconstructed log 46 then undergoes interactive refinement in comparator block 20b1d of FIG. 8 by the operator at the workstation 20. During refinement of the reconstructed log 46 in comparator block 20b1d, the reconstructed log 46 is compared, by comparator 20b1d, with the original low resolution log 26 and an "error signal" is generated, which error signal modifies the original rectangular deconvolved log 40 to produce a refined rectangular deconvolved log. If no further refinement of the refined rectangular log is necessary, the refined rectangular deconvolved log is not convolved again with the vertical response function 44; rather, since if no further refinement of the refined rectangular log is necessary, as indicated by decision block 20b1e of FIG. 8, the refined rectangular log is input directly to the volumetric analysis block 20b2 where it undergoes volumetric analysis by the ELAN software 20b2. The input low resolution log 26 appears as a dotted line adjacent the convolved reconstructed log 46 in FIG. 9.

Figure 10:
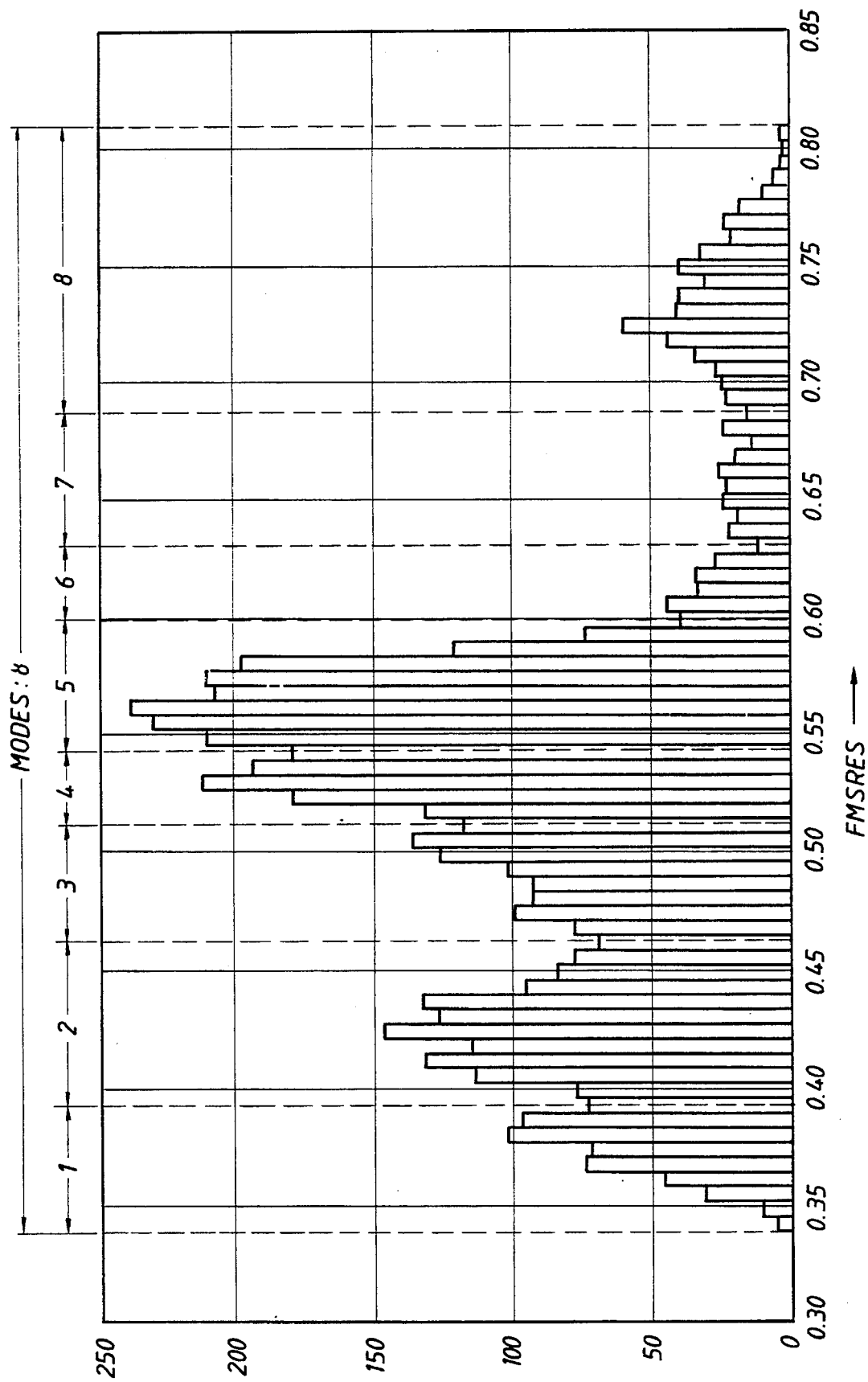
FIG. 10 illustrates a typical histogram which could be utilized by the SHARP interpretation software of the present invention during its functional operation as described in FIG. 9.

Referring to FIG. 10, a more realistic example of the histogram 30 of FIG. 9 is illustrated, the histogram of FIG. 10 being a plot of resistivity from the Formation Micro Scanner (FMS) high resolution well logging tool on the x-axis and frequency of occurance on the y-axis.

A functional operation of the SHARP software 20b1 of FIG. 8 will be set forth in the following paragraphs with reference to the detailed description of the preferred embodiment set forth below and to FIGS. 8–9 of the drawings.

Multi-Dimensional Analysis 20b1a

The squarelog block 28 of FIG. 8 receives the high resolution log 24 from a high resolution well logging tool and generates a squared version of the high resolution log, the squared version being represented by the squared log 36 in FIG. 9 of the drawings. The MD Analysis block 20b1a has stored therein a histogram 30 of FIG. 9 or a histogram similar to that shown in FIG. 10 of the drawings. The MD-Analysis block 20b1a determines the natural peaks in the histogram 30 indicating high frequency of occurrance of a particular resistivity for the FMS tool (FMSRES). It determines that there are three peaks; therefore, the MD-Analysis block 20b1a determines the locations along the x-axis of a first cutoff 32 as separating a mode 1 region from a mode 2 region and it determines the location along the x-axis of a second cutoff 34 as separating a mode 2 region from a mode 3 region. The cutoffs are selected to separate the higher peaks on the histogram 30. In FIG. 9, once the cutoffs 32 and 34 on histogram 30 are determined, the mode 1 region on the squared log 36 is determined to be region 36a, the mode 2 region on the squared log 36 is determined to be region 36b, and the mode 3 region on the squared log 36 is determined to be region 36c. Since there are three mode regions on the squared log 36 (mode 1 region 36a, mode 2 region 36b, mode 3 region 36c), three (3) basis functions h1(z), h2(z), and h3(z) exist and must now be determined. Basis function h1(z) in FIG. 9 is developed by determining the portions of the squared log 36 which exist in the mode 1 region 36a; therefore, the basis function h1(z) comprises four binary square wave pulses 38a, 38b, 38c, and 38d, one for each portion of the squared log 36 which exists in the mode 1 region. Similarly, basis function h2(z) is developed by determining the portions of the squared log 36 which exist in the mode 2 region 36b; therefore, the basis function h2(z) comprises five binary square wave pulses 38e, 38f, 38g, 38h, and 38i, one for each portion of the squared log 36 which exists in the mode 2 region. Similarly, basis function h3(z) is developed by determining the portions of the squared log 36 which exist in the mode 3 region 36c;

therefore, the basis function h3(z) comprises two binary square wave pulses 38j and 38k, one for each portion of the squared log 36 which exists in the mode 3 region. The basis functions h1 (z), h2 (z), and h3 (z) 38 are now developed. These basis functions 38 are generated from the MD-Analysis block 20b1a of FIG. 8, and are input to the MODINV block 20b1b in FIG. 8.

MODINV 20b1b

The Mode Inverse (MODINV) block 20b1b develops the rectangular deconvolved logs "$S(z_j)$" 40 in FIG. 9 from the N=3 basis functions h1(z), h2(z), and h3(z) 38 which were determined from the MD-Analysis block 20b1a. Refer to equation 10 in the Detailed Description of the Preferred Embodiment. Equation 10 provides the mathematical definition of the rectangular deconvolved logs 40, as follows: ti $S(z_j)$=SUMMATION [$hn(z_j)Sn$],
where $S(z_j)$ is the rectangular deconvolved log, $hn(z_j)$ are the basis functions and Sn are a set of modes which are calculated using equations 13, 20, and 21. In our example, since there are three (3) modes as determined from histogram 30 (mode 1, mode 2, and mode 3), then $hn(z_j)$ consists of h1(z), h2(z), and h3(z), and Sn consists of S1, S2, and S3. Therefore, the rectangular deconvolved logs "$S(z_j)$" 40 in FIG. 9 may be calculated and determined from: (1) the basis functions h1(z), h2(z), and h3(z), and (2) from S1, S2, and S3; more particularly, $$S(z_j)=S1h1(z_j)+S2h2(z_j)+S3h3(z_j).$$

The basis functions h1(z), h2 (z), and h3 (z) have already been determined since they were output from the MD-analysis block 20b1a.

The set of modes S1, S2, and S3 must now be determined. In order to determine the set of modes S1–S3, refer to equations 13, 20, and 21 in the Detailed Description of the Preferred Embodiment. Equation 13 is the general equation for determining how to solve for modes S1, S2, S3; however, equations 20 and 21 represent the specific solution to solve for S1–S2. Equations 20 and 21 represent two equations and two unknowns, where S1 and S2 are the unknowns. Therefore, one need only solve the system of two equations and two unknowns to solve for S1 and S2. In our example of FIG. 9, there are three (3) modes: mode 1, mode 2, and mode 3 as determined from histogram 30. Therefore, in our example, we must solve for the set of three modes: S1, S2, and S3. To solve for these three modes S1–S3, a natural extension of equations 20 and 21 would yield three equations and three unknowns, where S1, S2, and S3 are the three unknowns. For our example, equation 18 becomes:
$r(z_i)=S_1H_1(z_i)+S_2H_2(z_i)+S_3H_3(z_i)$ Using the same derivation technique described with reference to equations 19 through 21 in Detailed Description of the Preferred Embodiment, we now minimize the difference between the real log $t(z_i)$ and the reconstructed log $r(z_i)$ to yield a new equation 19 and then differentiate the new equation 19 with respect to $S_1$, $S_2$, and $S_3$ to produce three new equations and three unknowns, similar to equations 20 and 21, where the three unknowns are S1, S2, and S3. At this point, one need only solve the three equations and three unknowns to determine S1, S2, and S3.

Since the basis functions h1(z), h2(z) and h3(z) are determined, and the modes S1, S2, and S3 are determined, we need only solve the following equation (which is equation 10 in the Detailed Description of the Preferred Embodiment) to develop the rectangular deconvolved logs 40 of FIG. 9 which are output from the MODINV block 20b1b:

$$S(z_j)=S1h1(z_j)+S2h2(z_j)+S3h3(z_j).$$

Interactive Convolution 20b1c

The rectangular deconvolved log "$S(z_j)$" 40 is input to the interactive convolution block 20b1c where it is convolved with the well logging tool's vertical response function (a known quantity) thereby producing a reconstructed (convolved) log 46. Equation 5 of Detailed Description of the Preferred Embodiment is the relevant equation. In equation 5, the reconstructed log "$r(z_i)$ 46 is calculated as follows:

$$r(z_i)=\text{SUMMATION } g(z_i-z_j)S(z_j),$$

where $g(z_i-z_j)$ is the vertical response function of the well logging tool (a known quantity) disposed in the borehole which generated the original low and high resolution logs 26 and 24 which yielded the squared logs 36, and $S(z_j)$ is the rectangular deconvolved logs 40 derived above.

The reconstructed log 46 from the Interactive Convolution block 20b1c is input to the Comparator block 20b1d, discussed below, where an interactive refinement procedure is implemented thereby developing a refined rectangular deconvolved log. During the interactive refinement procedure, an operator at workstation 20 compares, visually, the reconstructed log 46 with the original low resolution log 26 and with the original rectangular deconvolved log 40; an "error signal" is produced which modifies the original rectangular deconvolved log 40 to produce the aforementioned refined rectangular deconvolved log. As noted by decision block 20b1e of FIG. 8, if further refinement is necessary, the refined rectangular deconvolved log is reconvolved with the well tool's vertical response function in convolution block 20b1c thereby producing a further reconstructed log which undergoes refinement again via comparator block 20b1d. Another error signal is generated which modifies again the refined rectangular deconvolved log to produce a further refined rectangular deconvolved log. However, as noted by decision block 20b1e, if no further refinement is necessary, the further refined rectangular deconvolved log is input directly to the volumetric analysis block 20b2 where a volumetric analysis is performed using the ELAN software 20b2. Equation 3 of the Detailed Description is the classical ELAN equation reflecting this volumetric analysis.

The ELAN software of the volumetric analysis block 20b2 performs a volumetric analysis on the refined rectangular deconvolved log developed from the Interactive Convolution block 20b1c to produce the volumetric analysis 22b1 shown in FIG. 7 of the drawings.

Comparator block 20b1d—Interactive Refinement.

During interactive refinement, comparator block 20b1d in FIG. 8 receives the rectangular deconvolved logs 40, the reconstructed logs 46 and the original low resolution logs 26; all three logs are displayed on the workstation 20 display where a visual comparison/interactive refinement procedure is implemented. During the refinement procedure, the log analyst, sitting at the workstation, can improve the match between the input low resolution log 26 and the reconstructed convolved logs 46 for particular zones. Then, taking in turn one bed at a time, beginning from the most significant beds, values of the rectangular deconvolved logs 40 can be adjusted by picking with a "mouse" one level at a time and changing its value in real time until a better approximation is obtained, ultimately producing a refined rectangular deconvolved log. As the amplitude of the rectangular deconvolved log 40 is modified, the reconstructed log 46 is recomputed and displayed in real time by means of a fast convolution algorithm. As a result, the reconstructed log 46 is deformed and animated in real time on the workstation display, which speeds up the refinement process and insures instant feedback to the user. As noted by decision block 20b1e, if further refinement to the refined rectangular deconvolved log is necessary, the refined rectangular deconvolved log is re-input to the Interactive Convolution block 20b1c where another convolution with the well tool's vertical response function takes place yielding a further reconstructed log. The further reconstructed log is input to comparator block 20b1d where the aforementioned visual comparison/interactive refinement procedure is reimplemented thereby developing a further refined rectangular deconvolved log. If no further refinement is necessary, the further refined rectangular deconvolved log is input directly to the volumetric analysis block 20b2. Arrow 42 in FIG. 9 refers to this interactive refinement procedure performed on the reconstructed log 46 by an operator at workstation 20. The interactive graphics software used to support this interactive refinement procedure implemented by the Comparator block 20b1d is called "Sunview" developed by Sun Microsystems, Inc, 2550 Garcia Ave, Mountain View, Calif. 94043. The "sunview" software, a Sun visual/integrated environment for workstations, is a window based user environment which uses the capabilities of a high resolution bit mapped screen.

Figure 11A:
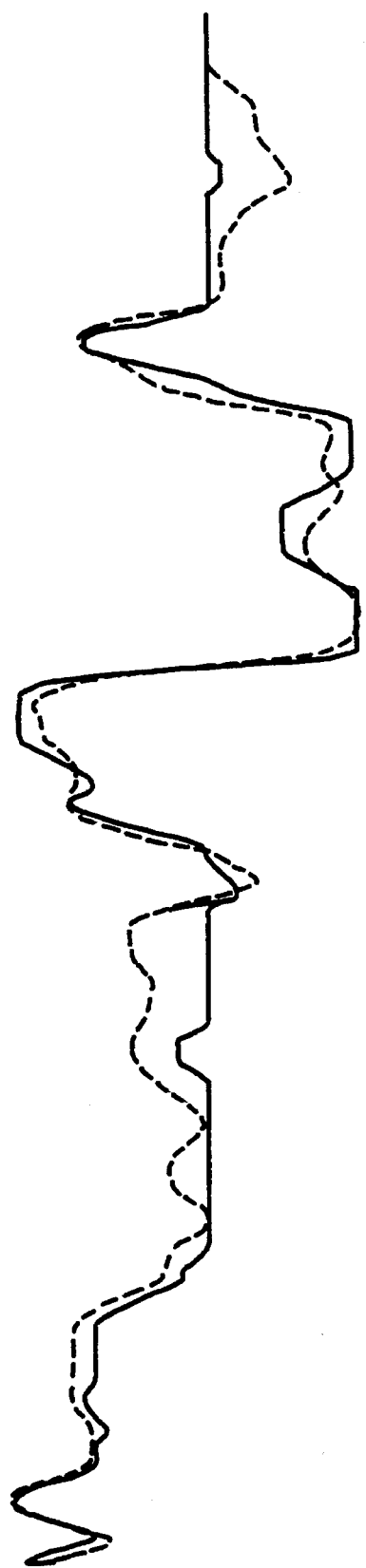
FIGS. 11a–11b illustrate typical rectangular deconvolved logs and reconstructed logs generated by the SHARP interpretation software of the present invention before interactive refinement performed by an operator at the workstation.
Figure 11B:
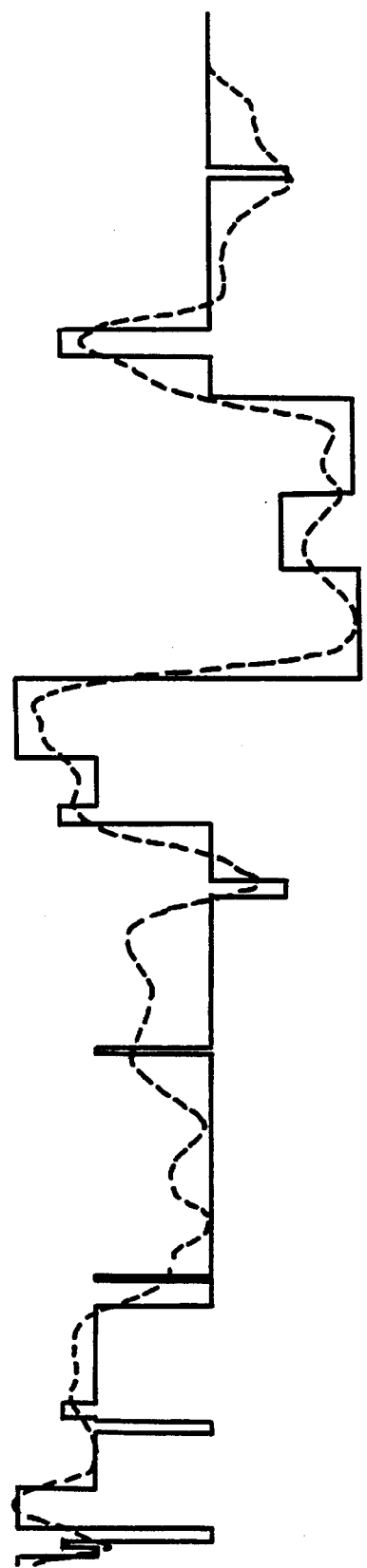
Figure 12A:
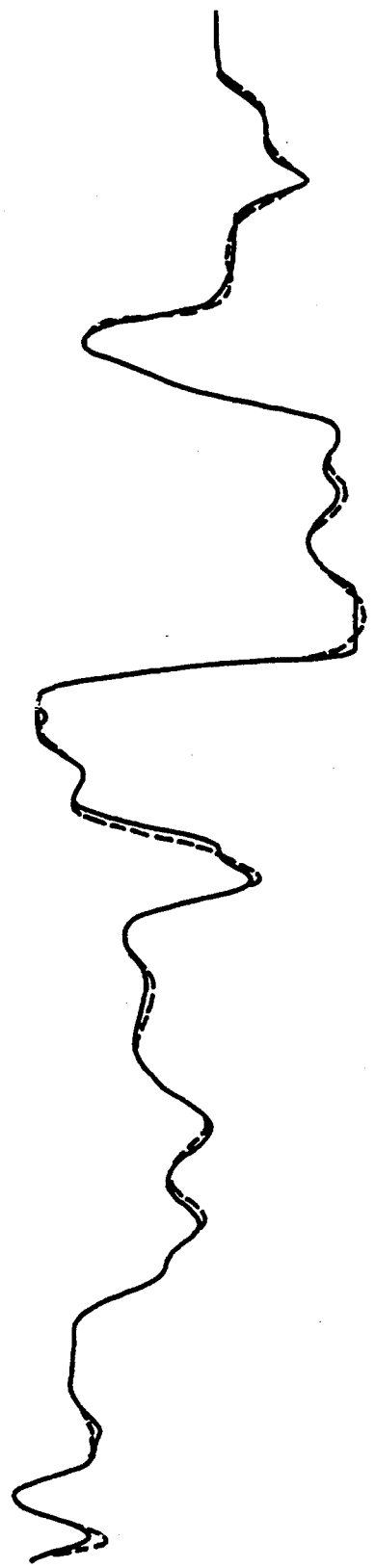
FIGS. 12a–12b illustrate typical rectangular deconvolved logs and reconstructed logs generated by the SHARP interpretation software of the present invention after interactive refinement performed by an operator at the workstation.
Figure 12B:
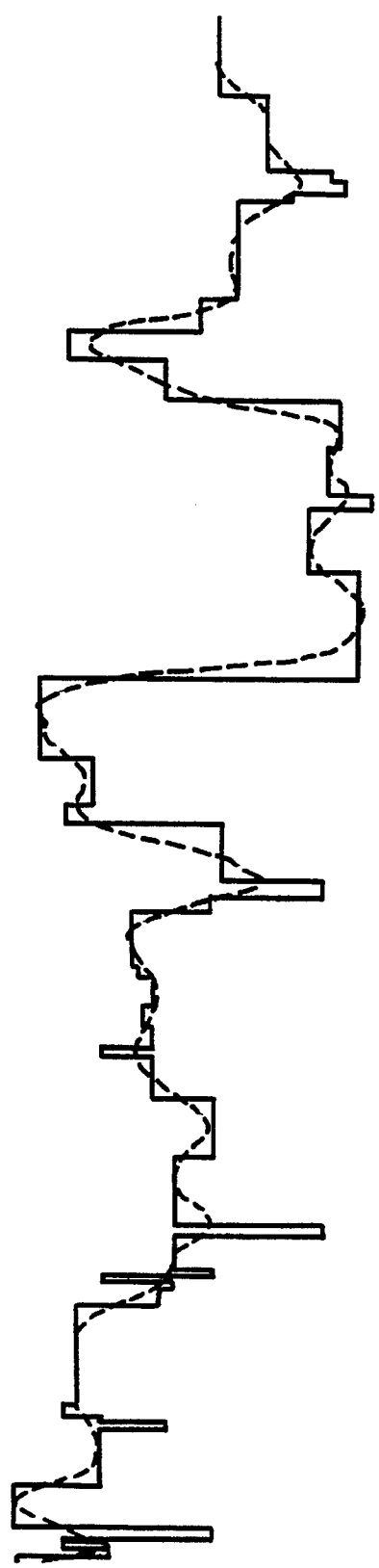

FIG. 11b illustrates a rectangular deconvolved log compared with the original low resolution log before interactive refinement, and FIG. 11a illustrates a reconstructed log compared with the original low resolution log before interactive refinement. FIG. 12b illustrated a refined rectangular deconvolved log compared with the original low resolution log after interactive refinement and FIG. 12a illustrates a further reconstructed log compared with the original low resolution log after interactive refinement.

Figure 13:
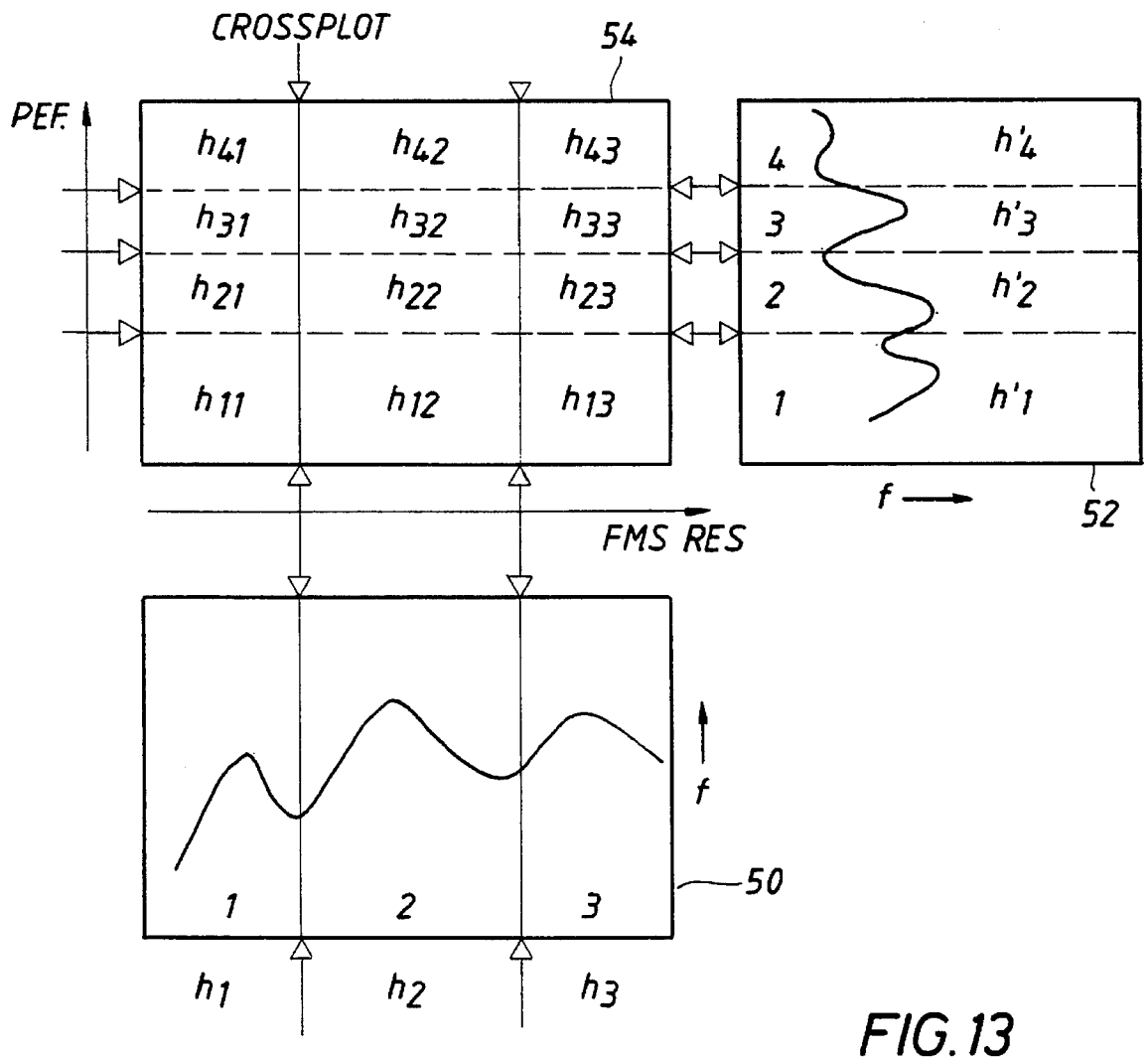
FIGS. 13–14 illustrate a crossplot diagram which could be utilized by the SHARP interpretation software of the present invention, in addition to the histogram of FIG. 10, during its functional operation as described in FIG. 9.

Referring to FIG. 13, note in FIG. 9 that three (3) basis functions 38 (h1, h2, h3) were derived from analysis of the squared log 36 using one histogram 30. However, in FIG. 13, seven (7) basis functions (h1, h2, h3) and (h1', h2', h3', h4') are derived from analysis of the squared log 36 using two histograms 50 and 52, one histogram representing, by way of example, resistivity of the laminated formation using a high resolution tool, such as FMS, having three modes giving rise to the three basis functions (h1, h2, h3), and the other histogram representing photoelectric effect having four modes giving rise to the four basis functions (h1', h2', h3', h4'). By way of definition for our example, a composite basis function $h_{ij}$ is defined to be equal to $h_i$ (where i is equal to 1 through 3) AND $h_j'$ (where j is equal to 1 through 4), that is:

$$h_{ij} = h_i \text{ AND } h_j'$$

A crossplot 54 is needed to determine or identify only those composite basis functions about which we are concerned in our example of FIG. 13. Therefore, referring to the crossplot 54, after crossing (that is, AND'ing) each mode i through 3 of histogram 50 with each mode 1 through 4 of histogram 52, twelve different composite basis functions are the result: h11, h12, h13, h21, h22, h23, h31, h32, h33, h41, h42, and h43. These twelve different composite basis functions are the only ones about which we are concerned in our example of FIG. 13. Recalling the aforementioned definition of a composite basis function and referring to the crossplot 54, it is evident that h11=h1 AND h1'; h12=h2 AND h1'; h13=h3 AND h1', h21=h1 AND h2', h22=h2 AND h2', h23=h3 AND h2', etc. Using the derivation technique used in connection with equations 20 and 21 of the Detailed Description below, twelve equations and twelve unknowns (S1 to S12) are determined; the twelve different unknowns or modes S1, S2,..., S12 are solved using the twelve equations and twelve unknowns, a process described above. The resultant rectangular deconvolved logs S(z) are solved as follows:

$$S(z) = S1 \; h11 + S2 \; h12 + \ldots + S11 \; h42 + S12 \; h43$$

This rectangular deconvolved log S(z) is convolved with the well logging tool's vertical response function (a known quantity), as indicated in equation 5 of the Detailed Description set forth below, to yield the reconstructed log r(z). The reconstructed log r(z) undergoes the aforementioned interactive refinement procedure in comparator block 20b1d to produce the refined rectangular deconvolved log. If no further refinement is needed as indicated by decision block 20b1e, the ELAN software performs a volumetric analysis on the refined rectangular deconvolved log to produce the new and improved volumetric analysis 22b1 of FIG. 7.

Figure 14:
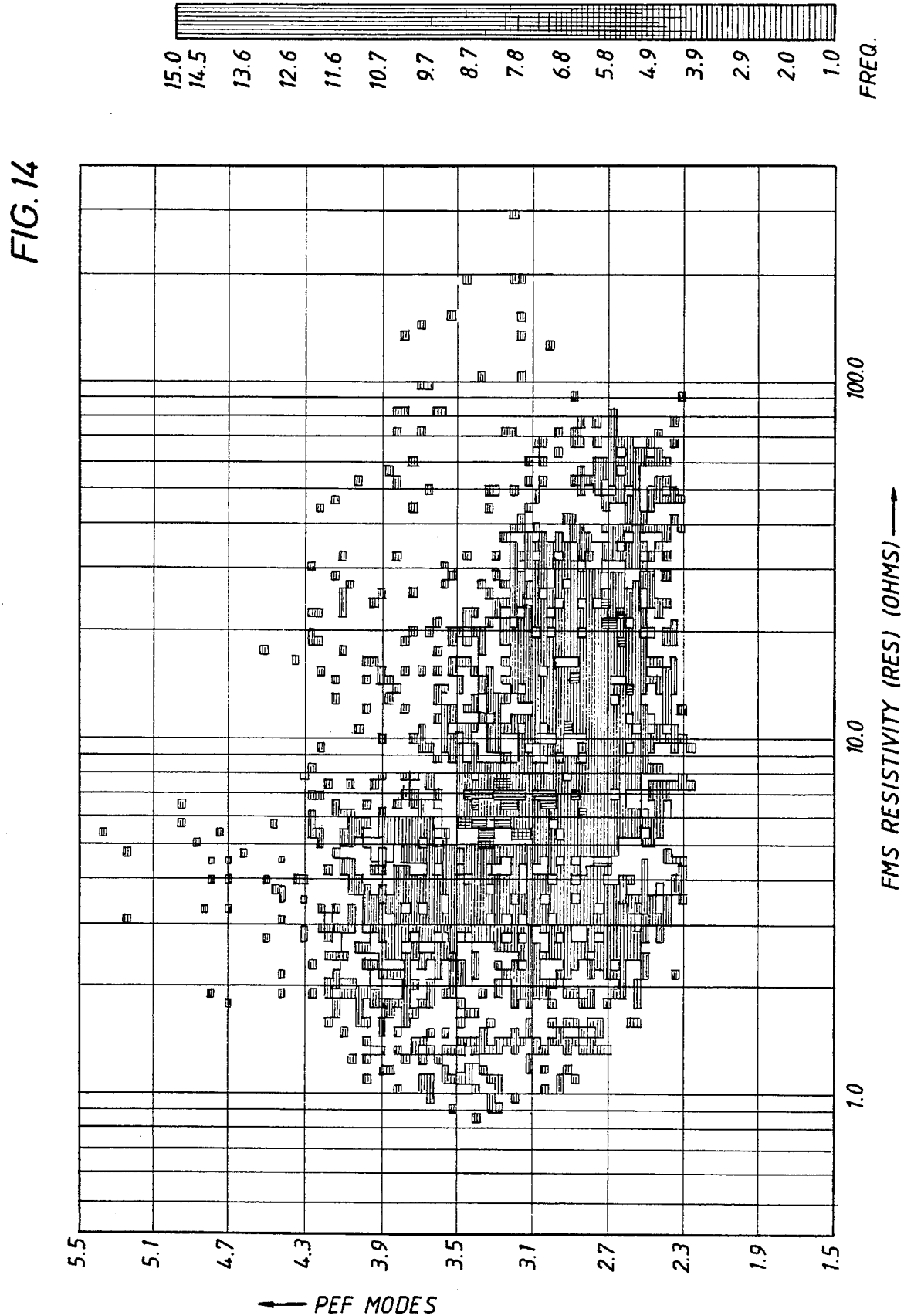
Figure 15:
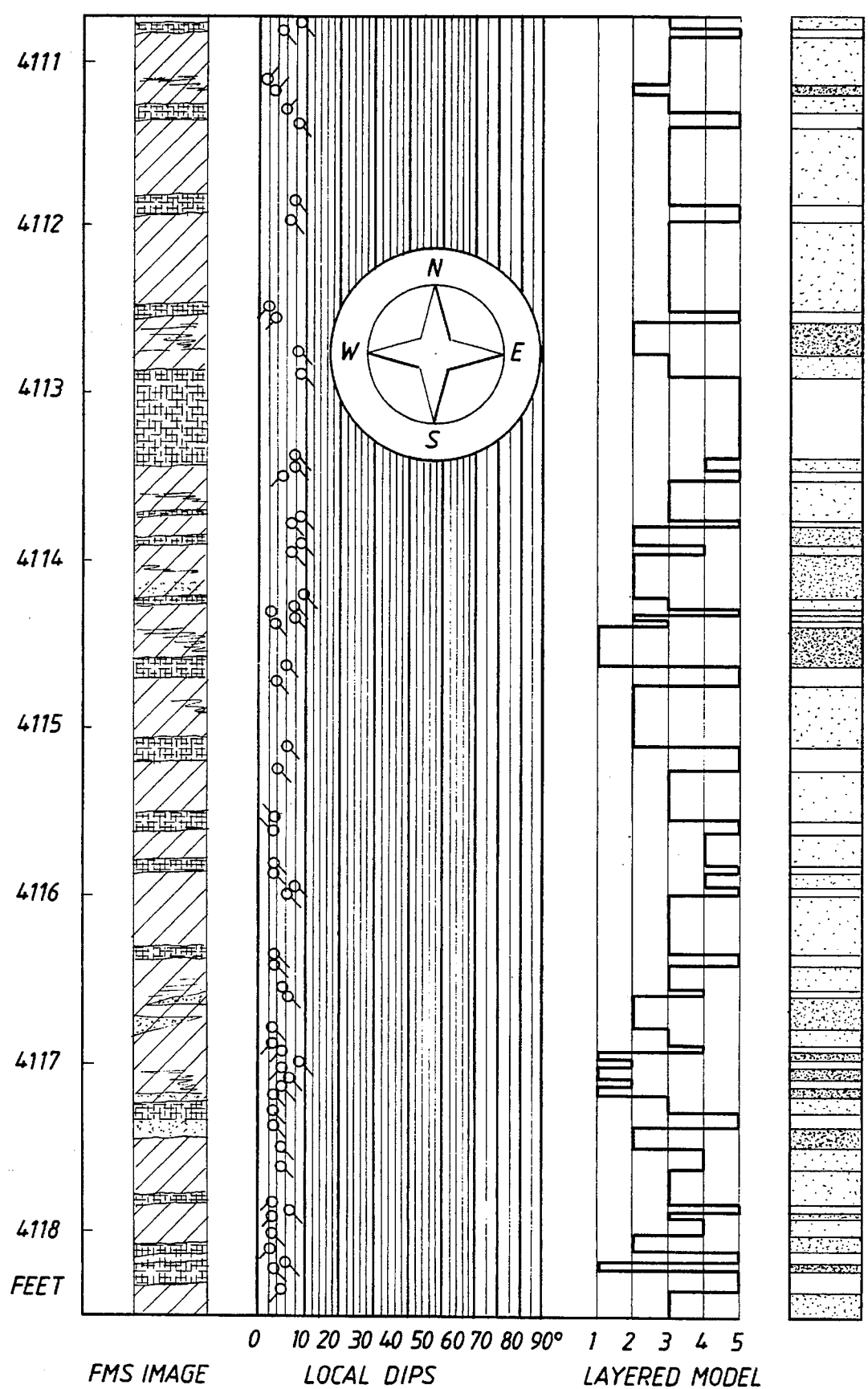
FIG. 15 illustrates a determination of bed location from a local dip and classification in modes.
Figure 16:
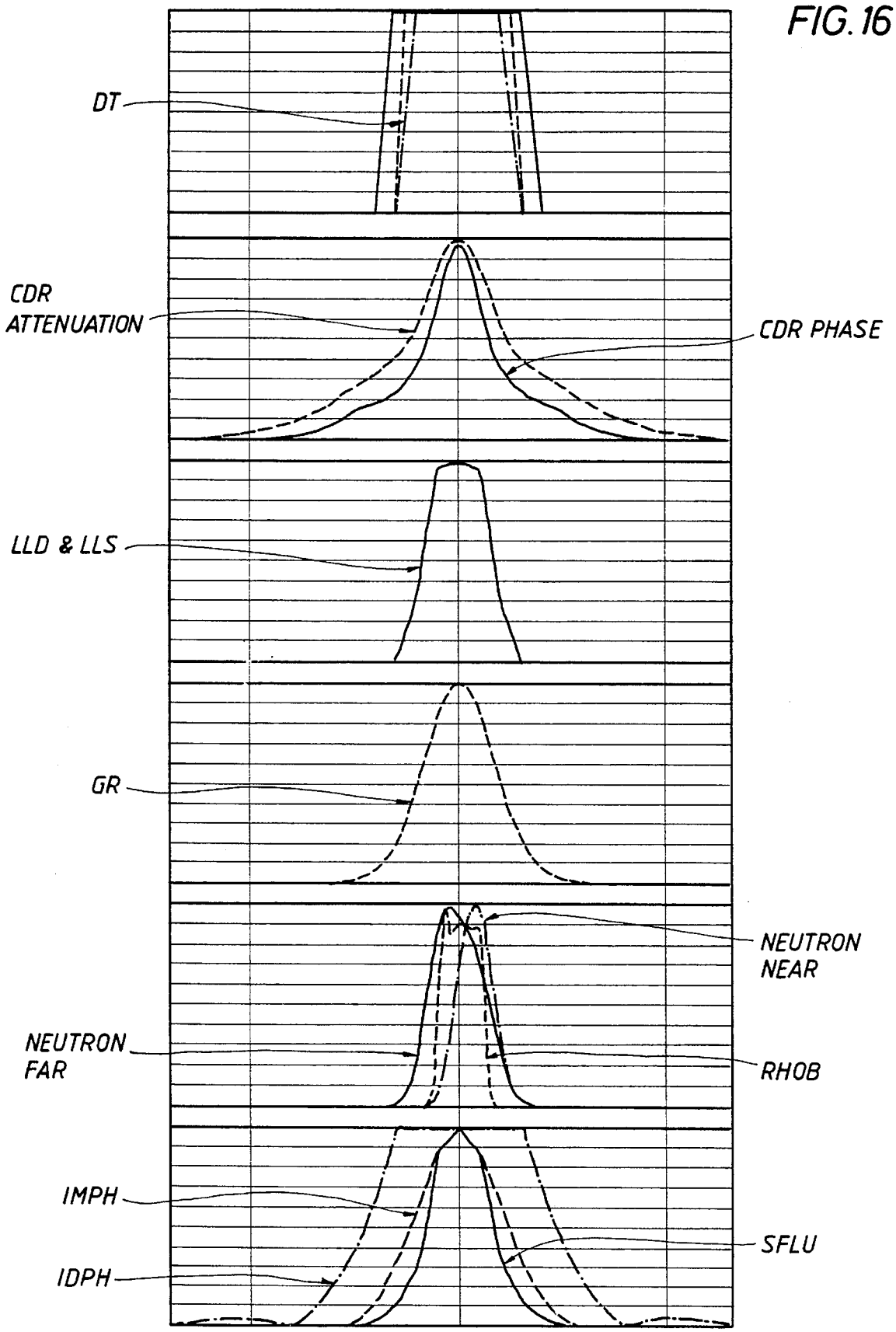
FIG. 16 illustrates examples of vertical response functions for various well logging tools.

FIG. 14 illustrates a typical crossplot which is analogous and similar to the crossplot 54 of FIG. 13.

It should be obvious to those skilled in the art that this mode selection technique can be extended to an arbitrary number of high resolution logs (more than two), the resulting basis functions being an AND applied on a combination of individual basis functions. For example, for three (3) high resolution logs, one would define a composite basis function $h_{ijk}$ as follows:

$$h_{ijk} = h_i \text{ AND } h_j' \text{ AND } h_k'.$$

DETAILED DESCRIPTION OF THE PREFERRED EMBODIMENT

1 SHARP Theory 1.1 Approximating the general problem

Logging tool measurements are not probing an infinitely small volume of formation as if they were point type measurements, but rather they are affected by formation properties extending around the depth at which the measurement is being made.

In practice the tool reading $<T_p(z_i)>$, at depth $z_i$ is a complicated function of space described by the cylindrical coordinate (r, θ, z) system, the volume of the various fluids and minerals which are present and the homogeneous individual tool response $r_{pj}$:

$$<T_p(z_i)> = F(r, \theta, z, V_j(r, \theta, z), r_{pj}) \text{ for all}(r, \theta, z) \quad (1)$$

where p is the tool number, and p∈{1, ..., $P_{max}$}$P_{max}$ being equal to the maximum number of tools, $<T_p(z_i)>$ is the effective tool reading in a layered media which takes into account the tool vertical response, $V_j$ is the volume of element (mineral or fluid) j, r, θ, z are the cylindrical coordinates, $r_{pj}$ is the tool response for $V_j=1$.

1.2 ELAN and RTGLOBAL

To simplify the solution to the most general problem, assumptions are generally made to separate the various effects. The two existing methods, ELAN[9] and GLOBAL [10], assume that each layer is sufficiently thick to treat each logging measurement as if it were made in an homogeneous medium. This is why these methods fail to give accurate answers in laminated reservoirs.

However, unlike Neutron, Density and Microresistivity, Induction and Laterdog measurements are influenced by formation property within several borehole diameters around the borehole because of their extended radial depth of investigation. RTGLOB was specifically designed to approximate the 2-D interpretation problem by allowing the petrophysical properties to vary in the radial direction.

Specific assumptions made inside ELAN and RTGLOB are presented in Sections 6 and 7.

1.3 SHARP: a new method for Thin Bed Analysis

When the formation is thinly laminated, it is no longer possible to assume that tool measurements are not influenced by adjacent layers. We have seen earlier that LSA provides a methodology specific to shaly sands drilled with fresh or oil base mud. LSA is, however, presently a batch oriented LOGOS program which is not modular and which cannot be easily expanded to new high. resolution measurements. It is also our belief, that there is some advantage to separate the problem of estimating the logging values of each layer and the final high resolution petrophysical analysis. In effect, both are strongly intermixed inside the LSA code.

A flexible and modular new method called SHARP has been developed and is described hereafter.

The heart of the method lies in a technique, called Mode Inversion and referred later as MODINV.

If we refer to the formulation of the general formation evaluation problem, three basic assumptions are made:

the function F is assumed to be independent of $(r,\theta)$ and to be dependent only on depth, the spatial response can be approximated by a convolution operator $g(z)$, the reservoir is assumed to be laminated and location of the layer boundaries is known or can be inferred from a high resolution measurement.

Mathematically, the tool reading, $<T_p(z_i)>$, at depth $z_i$ is given by the following expression:

$$<T_p(z_i)> = \sum_k g_p(z_i - z_k) T_p(z_k) \quad (2)$$

where, $g_p(z)$ is the vertical tool response for the $p^{th}$ tool and, $T_p(z_i)$ is the effective tool response in an homogeneous layer of thickness sufficiently large enough to be considered infinite in vertical extent.

Knowing $<T_p(z_i)>$, $g_p(z_i-z_k)$ and the boundary location, $T_p(z_i)$ can be estimated. The volumes $V_j$ can then be computed by solving the classical ELAN equation of formation evaluation:

$$T_p(z_i) = \sum_j V_j(z_i) r_{pj} \; \forall \, p \in \{1, \ldots, p_{max}\} \quad (3)$$

The same approach can be extended to the general situation where formation properties are allowed to vary not only along the well axis but also in the radial and azimuthal direction.

The tool response must be expressed as a 3-D convolution with operator $g(r,\theta,z)$. (As far mandrel tools are concerned, since they have azimuthal symmetry, the convolution operator g is only a function of two variables r and z).

If we assume also that the homogeneous tool response is a linear function of the individual volumes $V_j$, one can write $$<T_p(z_i)> = \sum_k \sum_l \sum_m g_p(z_i - z_k, \theta_i - \theta_l, r_i - r_m) \sum_j V_j(z_k, \theta_l, r_m) r_{pj} \quad (4)$$

1.4 MODINV an Amplitude Modal analysis method for Thin Bed Analysis

Several attempts have been made in the past to deconvolve low resolution logs by inversion. Usually, this approach yields extensive computer usage and stability problems,[23] especially with noisy data. Very often, a more physical solution can be obtained if a good first guess is assumed and if the problem is "regularized" by taking into account external a priori knowledge.

With these limitations in mind, a method was developed called MODINV (for Mode Inverse), an amplitude modal analysis which takes advantage firstly, of external information on layering and boundary locations, and secondly, which classifies the various layers into a finite number of modes or electro-facies. MODINV provides, therefore, a robust method to generate a first educated guess. Refinements and improvements over this initial solution are provided by further processing and interactive capability on the SUN workstation, as we shall see later on.

1.5 Definition of bed boundaries and mode selection

A high resolution log such as SHDT, FMS [13],[14], OBDT and EPT [15] is used to delineate the location of boundaries, and to classify the beds into a finite set of modes, as show on FIG. (15). When only one high resolution log is used for this classification, one should talk only of modes. It is only when several high resolution logs are available, each sensitive to different petrophysical parameters, that one should extend the concept of modes to electro-facies.

Nevertheless, the governing idea is that, in a statistical sense, one can classify the layers in a finite number of modes from an inspection of the histogram of a high resolution measurement. From a geological sense also, one can argue that laminated reservoirs are often the result of a cyclic sedimentary process which tends to deposit similar materials in cycles over long period of times. Turbidires are good examples of such a repetitive process. Even the most simple shaly sand reservoir can be visualized as made of a combination of two kind of formation; clean sand and pure shale.

In summary, the hypothesis underlying MODINV is that, in each mode the petrophysical parameters such as bulk conductivity, density, neutron porosity, sonic velocity are constant but unknown. A histogram of the high resolution measurement, or a cluster analysis of several high resolution logs is used to assign each layer to a specific mode or "electro-facies". Finally, the mode parameters are the ones which result in the best match between the reconstructed logs and the real logs. The reconstructed logs are computed by convolving each low resolution tool response function with the rectangular log computed by MODINV.

1.6 Mathematical representation

Let us assume that the tool reading at depth $z_i$ can be represented as a convolution of $S(z_j)$, the tool reading at depth $z_j$ if it had infinite resolution, by $g(z_i-z_j)$, the tool vertical response function, also known as vertical geometrical factor for induction tools:

$$r(z_i) = \sum_j g(z_i - z_j) S(z_j) \quad (5)$$

Suppose also, that $S(z_j)$ can take only discrete values which we have called "Modes", reserving the designation of Electro-Facies for the case where more than one high resolution log is processed:

$$S(z_i) \in \{S_1, S_2, \ldots S_n, \ldots, S_N\} \forall z_i \quad (6)$$

The total number of modes, N, will be in practice, much smaller than the total number of beds detected in the interval under consideration.

Let us now define a series of N basis functions, $h_n(z_i)$. These functions have the following properties: they are binary $$h_n(z_i) \in \{0,1\} \forall n \forall z_i \quad (7)$$

their sum is normalized to unity $$\sum_n h_n(z_i) = 1 \forall z_i \quad (8)$$

and they are orthogonal.

$$\sum_i h_n(z_i) h_p(z_i) = 0 \forall n,p \; n \neq p \quad (9)$$

From the preceding definitions, $S(z_j)$ can be expressed as $$S(z_j) = \sum_n h_n(z_j) S_n \quad (10)$$

where $S(z_j) = S_n$ if and only if $h_n(z_j) = 1$
Equation (5) then becomes:

$$r(z_i) = \sum_n S_n \sum_j g(z_i - z_j) h_n(z_j) = \sum_n S_n H_n(z_i) \quad (11)$$

with $$H_n(z_i) = \sum_j g(z_i - z_j) h_n(z_j) \quad (12)$$

For a given layering, the basis functions $h_n(z_j)$ are fixed and the N unknown values $S_n$ are solved, in a least squares sense, by minimizing the sum over the depth interval of the square of the residual between the tool measurement $t(z_i)$ and the reconstructed log $r(z_i)$:

$$\min \sum_i [t(z_i) - r(z_i)]^2 \quad (13)$$

In section 4 one shows that equation (13) is equivalent to solving a system of N equations with N unknowns.

1.7 Mode selection with a single high resolution log

In order to select the modes, a high resolution log histogram must be computed. As shown on FIG. (10), an FMS histogram is plotted which shows the frequency of occurrence of FMS derived conductivity as a function of increasing conductivity. When the histogram displays several peaks, the principal modes are easily picked. Very often, however, the histogram looks more like a continuous spectrum. In this case, one must partition the FMS conductivity into a sufficient number of bins to best approximate the original histogram or to insure that every mode is equally populated.

At the moment, there is no systematic way to determine automatically the maximum number of modes to be used. Experience, local knowledge, core information can certainly help. In general, too few modes will result in a poorer log reconstruction, while too many modes would decrease the relative weights of each mode in the modal inversion since the population of each mode would become insignificant. From a practical point of view, the strategy should be to select a sufficient number of modes to approximate as well as possible the original histogram, to make sure that the population in each mode is significant and to insure a good log reconstruction. The present implementation allows the user to select the precise location of each cut-off, and also to delete, add or displace them interactively.

1.8 Adding a single mode for a particular bed

Once the intervall has been processed by a first pass of MODINV, the user may decide to refine the results based on the quality of the log reconstruction. To improve the overall inversion, the user may choose to select an additional mode for a particular set of beds. If for instance, N was the total number of mode before this addition and $h_{x+1}(z_j)$ is the additional basis function corresponding to this bed, the MODINV formalism can be modified in the following fashion.

The number of modes is now N+1 and the new basis functions $\{h_n(z_i)\}_{New}$ are related to the original ones in the following manner:

$$\{h_n(z_i)\}_{New} = \{h_n(z_i)\}_{Old}[1 - h_{N+1}(z_i)] \forall \; n \in \{1,N\} \quad (14)$$

and $$\{h_n(z_i)\}_{New} = h_{N+1}(z_i) \quad (15)$$

for n=N+1 the rest of the calculations would be carried out as before, but this time with N+1 modes.

1.9 A multidimensional approach to Mode Selection

One of the limitations in using only the FMS to select modes or electro-facies, is that the FMS conductivity alone cannot always distinguish between different facies which have similar bulk conductivity. For example on the FMS, a tight zone might look similar to a gas zone. A sand reservoir cannot be differentiated from a calcite reservoir.

One way to resolve this possible ambiguity, is to include other high resolution measurements in the mode selection procedure. For instance the EPT Travel Time ($t_{pl}$) and Attenuation, (EATT) or the Photo-electric effect ($P_{ef}$) could be used to select the modes.

FIG. (14) illustrates how the 5 original modes defined from FMS conductivity can be discriminated to 25 by introducing another dimension corresponding to 5 Pef modes.

As an example, let us assume that we combine the Pef measurement with the FMS in order to select the modes. Using the FMS conductivity histogram as one criteria, will yield a series of N basis functions: $h_n(z_i)$ for $n \in \{1,N\}$.

Similarly, a histogram of the $P_{ef}$ could be used to select P modes and as a result P basis functions: $h_p(z_i)$ for $p \in \{1,P\}$.

The new basis functions which must be used in the modal inversion, becomes a function of two parameters n and p and can be written as a product:

$$h_{n,p}(z_i) = h_n(z_i) h_p(z_i)$$

The maximum total number of modes is now: M=NP. Generalization to T high resolution logs would yield:

$$h_{n,p,\ldots,t}(z_i) = \prod_{r=n,p,\ldots,t} h_r(z_i) \quad (16)$$

From this point on, the modal inversion will be carried out in the same manner as before, but this time with a total number of modes equal to M:

$$M = NP \ldots T$$

Although the goal of this analysis is reminiscent of FACIOLOG [16] and LITHO [17], the technique presented here is entirely different. Moreover, TBAT high resolution measurements (Rxo SAID, Density, Pef, EPT Attenuation and Tpl), will considerably help in defining the most significant modes. These modes will correspond in fact to electro facies with real geological significance.

1.10 Low Resolution Tool Response Functions

Approximating a logging measurement by a convolution transformation represents the cornerstone of the SHARP methodology. The convolution kernel is equivalent to the so called "geometrical factor" of electrical tools. In general, this kernel is a 3-D function. In the first phase of the SHARP project, it is assumed that the logging response to laminated reservoirs can be approximated by a 1-D convolution kernel. Future extension to 2-D, to take into account radial variations due to invasion or azimuthal variations due to heterogeneities, is briefly outlined in appendix B and C.

To be a valid approximation, the convolution must be performed in a space which is quasi linear at least over a certain range of the parameter space. For instance, an induction tool is a conductivity tool. In axisymmetrical problems, each elemental toroidal volume of formation with cross section, $\delta r \delta z$, contributes to the raw induction signal, the overall measurement being just the sum over all values of r and z of all contributions. Examples of Vertical Response Functions for some of our current and upcoming logging measurements are plotted on FIG. (16).

For some tools, the raw measurements like the count rates of a Neutron cannot be represented accurately by a simple convolution. A mathematical transformation must be applied to the raw measurement in such manner to make the transformed output approximated by a linear convolution. For instance a resistivity measurement must be first transformed by an inverse arithmetic transform into a conductivity before the measurement can be well approximated by a convolution operation. This necessary step insures that the response is quasi linear in the the ransformed space.

The second assumption is that the convolution operator is quasi independent of the amplitude of the response. In other words, the geometrical response of an Induction tool is assumed to be invariant with the level of conductivity. Over a limited range, this is a valid assumption for the standard Induction log, but introduction of the Phasor processing by T. Barber[22] has resulted in a new processed conductivity measurement which can be approximated well by a single 1-D vertical geometrical factor over more than three decades of conductivity.

The vertical response function of our logging tools is not known with the same degree of accuracy. For instance, the Induction response can be calculated exactly by mathematical modeling. For some tools like the Density, Monte Carlo simulation performed by C. Case has been used to estimate the Density sensitivity function. This function is subject to statistical uncertainty inherent to the Monte Carlo method.

Finally, for some tools like the Neutron, the vertical response function has been estimated experimentally from lab measurement. As a result, the degree of confidence for each response function depends strongly on the method used to estimate it. It is however very likely, given past experience, that progress will be made to improve our knowledge of the response function of most openhole logging tools.

1.11 Mode amplitude estimation by Least Squares Minimization

As we have shown in the preceding sections, the minimization of the residuals can be reduced to solving a linear system of N equations with N unknown Mode values: $\{[S_1, S_2, \ldots S_n, \ldots, S_N]\}$.

The same linear solver implemented in ELAN, is being used in MODINV. Up to 99 distinct modes can be solved with the possibility to extend it to a greater number of unknowns, if that is found desirable in the future.

1.12 Constraints imposed on the solution

Like for the volumetric analysis of ELAN, linear constraints could be specified between the unknowns. For instance in the present SHARP implementation, one can constrain the solution for a Neutron count rate to lie within a valid physical range. Similarly, a Density or an Induction deconvolved log can be bounded by the extreme values observed over a given interval.

2 SHARP Prototype Implementation on the SUN

Figure 18:
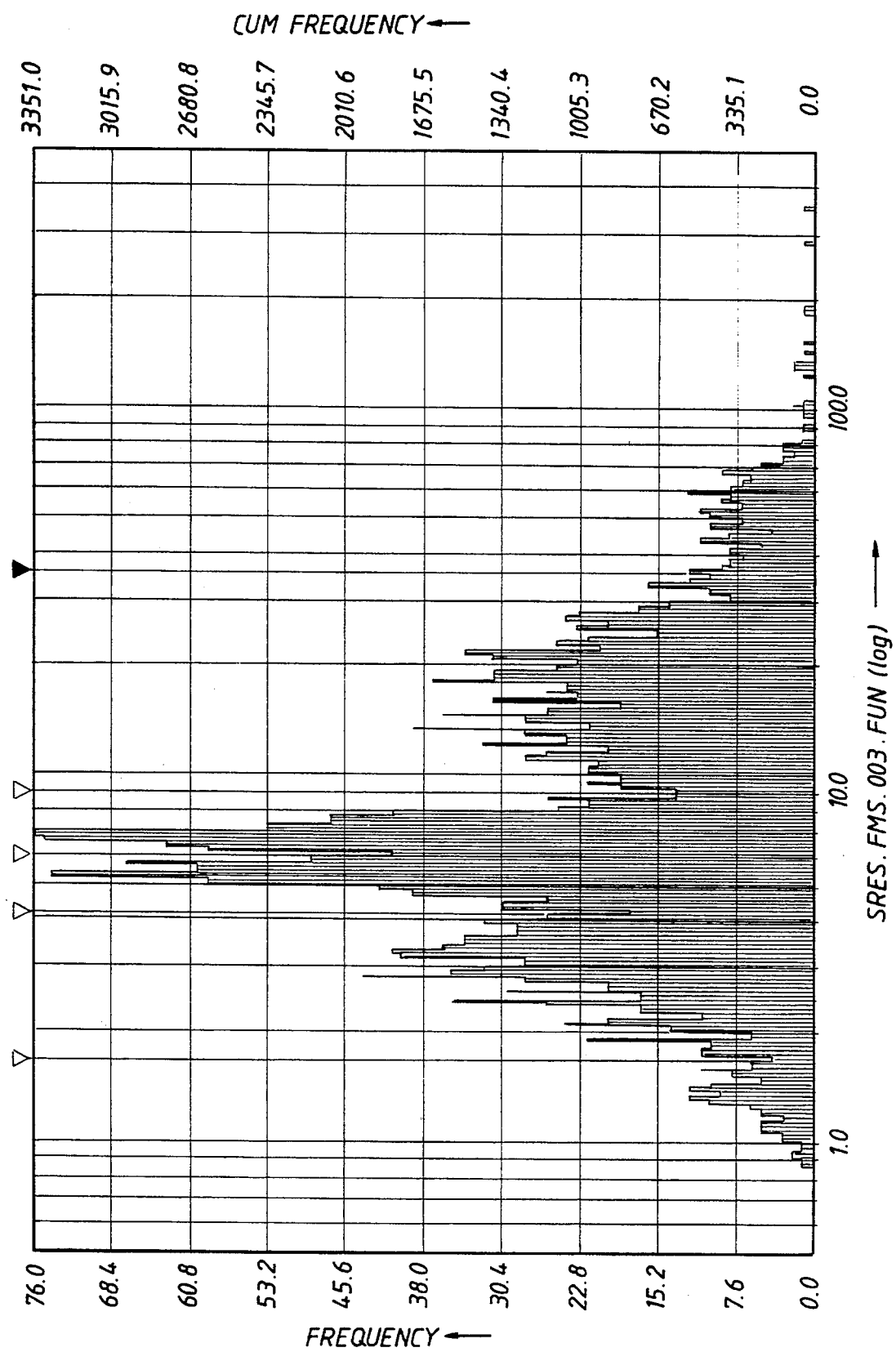
FIG. 18 illustrates a screen dump of an interactive histogram module for FMS resistivity.
Figure 19:
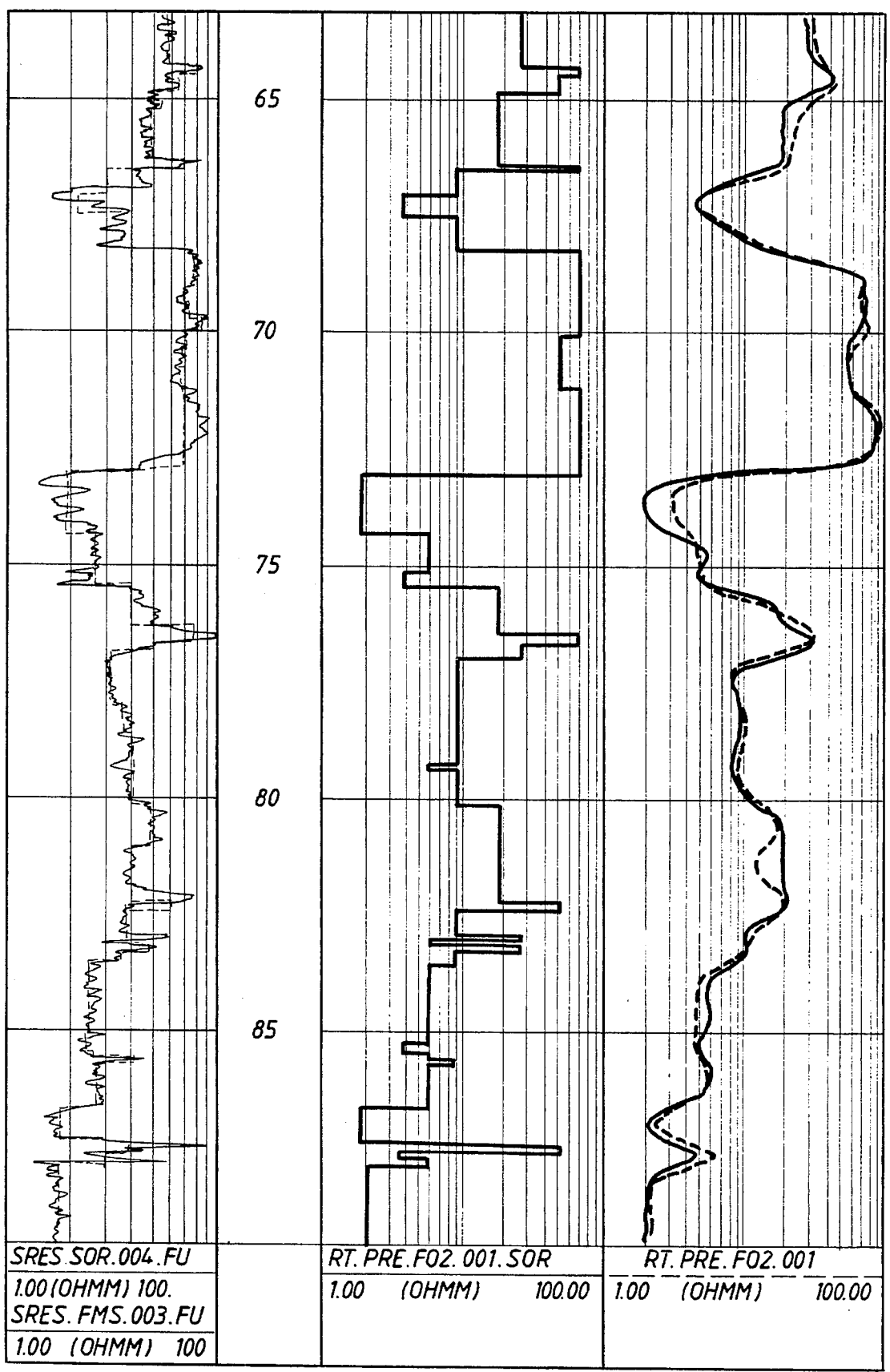
FIG. 19 illustrates enhanced rectangular logs as seen on the workstation screen by the operator before interactive refinement.

The SHARP methodology is implemented as a prototype on a SUN workstation. The five main modules are:

squarelog This module detects significant inflection points on a high resolution input log. These inflection points are interpreted as bed boundaries which are used to construct a squared version of the input log.

modinv This module covers the modal inversion part of SHARP. Cutoff values needed to define the modes are imported either from a histogram (FIG. 18) or from a crossplot (FIG. 14) when more than one high resolution log is used.

histogram This graphic module allows to display and manipulate a histogram of the input log (FIG. 18). The histogram allows to overlay several cutoffs on the display. Cutoffs can be created, deleted and moved. The histogram module communicates cutoff values defining the modes to the modinv module.

logplot This graphic module is a powerful interactive log display where the interactive convolution and animation has been implemented (FIG. 19, 11a & 11b and 12a & 12b). This module is an unvaluable tool for final analysis and quality control of the rectangular logs output by SHARP.

crossplot This last graphic module can produce a scattered X-Y plot of two input logs. The Z-axis value is coded by a color scale and is driven either by a third log or by the dot density. In the latter case, the crossplot turns into a 2-D histogram on which cutoffs values on both axes can be placed (FIG. 14).

Figure 17:
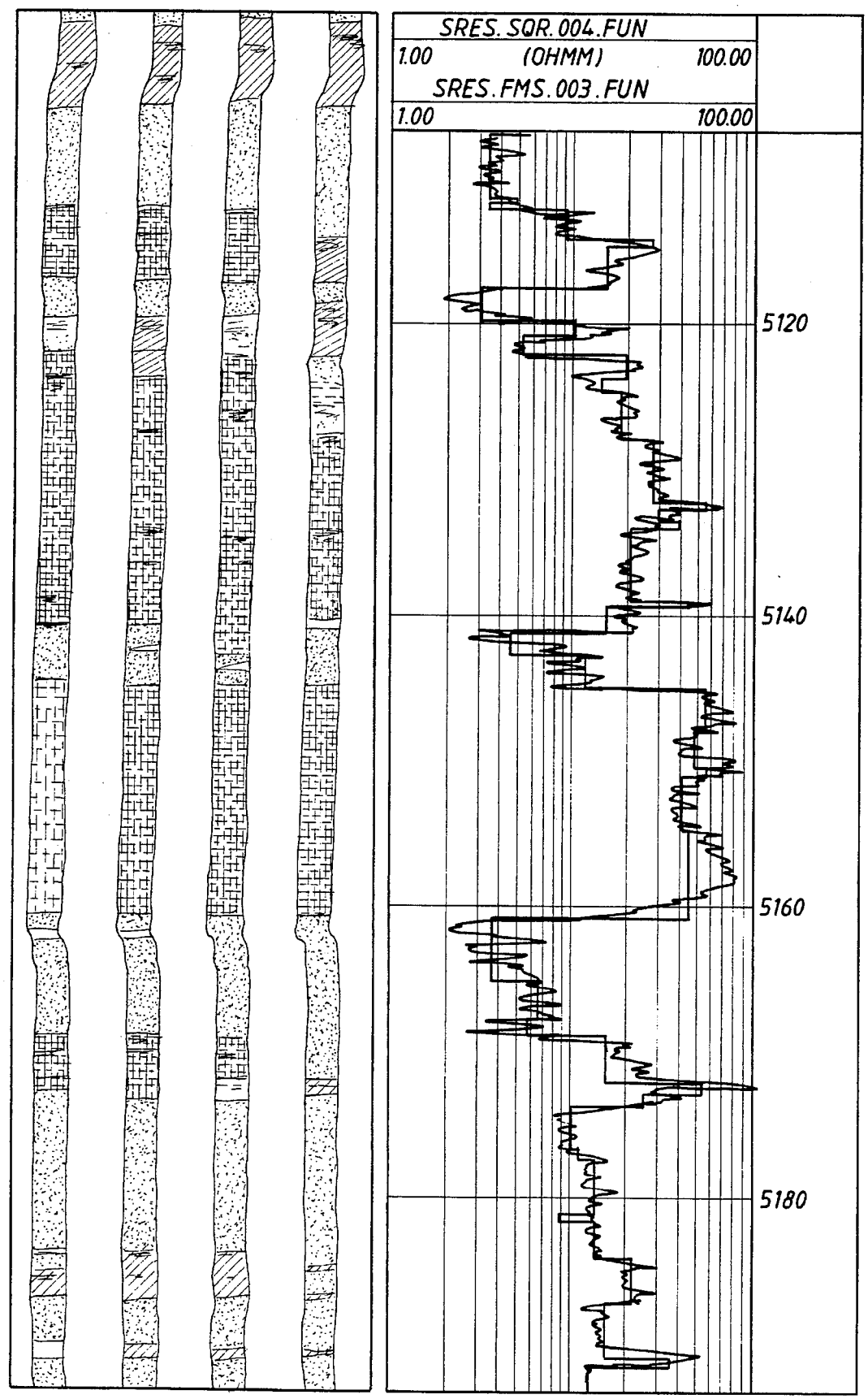
FIG. 17 illustrates an example showing a Formation Microscanner (FMS) image and the corresponding FMS resistivity and the FMS resistivity squared log.

An added benefit of using the SUN workstation is to be able to display and scroll FMS images using FLIP alongside a log display (FIG. 17).

The SUN implementation comes with communication modules to transfer log data back and forth between the VAX/LOGOS and SUN/FLIP environments.

3 References

The following references were noted in this specification; the disclosures associated with each of these references are incorporated by reference into this specification:

[1] Doll H., "Method and Apparatus for providing Improved Vertical Resolution in Induction Well Logging, including Electrical Storage and Delay Means", U.S. Pat. No. 3,166,709, 1965

[2] Poupon A., Loy M. E, and Tixier M.; "A contribution to Electrical Log Interpretation in Shaly Sands", Trans, AIME 1945 Vol. 201, 138, 145

[3] D. F. Allen "Laminated Sand Analysis", SPWLA 25 th Annual Logging Symposium, 1984

[4] M. Bilsland, R. Mobed, E. Cheruvier, "Predicting Hydrocarbon Saturations in Thin Sandstones drilled with oil-based mud", SAID Paris, Oct. 24-25-26, 1989

[5] Suau J. et al., "Interpretation of very thin Gas Sands in Italy", SPWLA 25 th Symposium, 1984

[6] Barber T.; "Induction Log Vertical Resolution Enhancement-Physics and Limitations", Trans., 1988 SPWLA, San Antonio

[7] Galford J. E, Flaum C., Gilchrist W. A., and Duckett S. W.: "Enhanced Resolution Processing of Compensated Neutron Logs", paper SPE 15441, 1986 SPE, New Orleans

[8] Flaum C. and Galford J .E., "Enhanced Vertical Resolution Processing of Dual Detector Gamma-Gamma Density Logs", SPWLA 1987, 28 th Annual Logging Symposium

[9] Quirein J., Kimminau S., La Vigne J., Singer J. and Wendel F., "A Coherent Framework for developing and applying Multiple Formation Evaluation Models", SPWLA

[10] Mayer C. and Sibbit A., "A New Approach to Computer-Processed Log Interpretation", SPE 9341, 1980

[13] Ekstrom M. P., Dahan C., Rossi D. "Formation Imaging with Micro Electrical Scanning Arrays". Log Analyst, No 3,294–306 Jun. 1987

[14] J. C. Trouiller, J. P. Delhomme "Thin-Bed Reservoir Analysis from Borehole Electrical Scanning Arrays", SPE 19578, Oct. 1989

[15] M. Andreani., "Quantitative Evaluation of Highly Laminated, Complex Lithology Formations", SPE 17944, March 1989

[16] Wolff M and Pelissier-Combescure J., "Automatic Electrofacies Determination", 1982

[17] Delfiner P. C., Peyret O. and Serra O., "Automatic Determination of Lithology from Well Logs", SPE 13290, 1984

[22] Barber T., "Introduction to the Phasor Dual Induction Tool", JPT, 1985

[23] Freedman R. and Minerbo G., "Maximum Entropy Inversion of Induction Log Data", SPE Formation Evaluation, June 1991

4 Modal Analysis Theory

Suppose we have only two distinct modes: $S_1$ and $S_2$ and we designate by:

$t(z_i)$ the actual tool measurement at depth $z_i$
$r(z_i)$ the reconstructed log value at depth $z_i$
The reconstructed log value becomes:

$$r(z_i) = S_1 \sum_j g(z_i - z_j) h_1(z_j) + S_2 \sum_j g(z_i - z_j) h_2(z_j) \quad (17)$$

If we let $$H_1(z_i) = \sum_j g(z_i - z_j) h_1(z_j)$$

and $$H_2(z_i) = \sum_j g(z_i - z_j) h_2(z_j)$$

then equation (17) can be written as:

$$r(z_i) = S_1 H_1(z_i) + S_2 H_2(z_i) \quad (18)$$

In order to estimate $S_1$ and $S_2$, we minimize the difference between the real log $t(z_i)$, and the reconstructed log $r(z_i)$:

$$\min \sum_i [r(z_i) - t(z_i)]^2 = \min \sum_i [S_1 H_1(z_i) + S_2 H_2(z_i) - t(z_i)]^2 \quad (19)$$

Differentiating with respect to $S_1$ and $S_2$ gives rise to a system of two equations with two unknowns:

$$\sum_i H_1(z_i)[S_1 H_1(z_i) + S_2 H_2(z_i) - t(z_i)] = 0$$

$$\sum_i H_2(z_i)[S_1 H_1(z_i) + S_2 H_2(z_i) - t(z_i)] = 0$$

or $$S_1 \sum_i H_1(z_i)^2 + S_2 \sum_i H_1(z_i)H_2(z_i) - \sum_i t(z_i)H_1(z_i) = 0 \quad (20)$$

$$S_2 \sum_i H_2(z_i)^2 + S_1 \sum_i H_1(z_i)H_2(z_i) - \sum_i t(z_i)H_2(z_i) = 0 \quad (21)$$

This formulation can be generalized to N modes. Let $R=[r(z_i)]$ be the vector formed by the reconstructed log values, $S=[S_j]$ be the vector formed by the N mode values and $H=[H_j(z_i)]$ be the matrix formed by the N convolved basis functions. Then equation (18) can be written as:

$$R = H \cdot S$$

If we let $T=[t(z_i)]$ be the vector of actual tool measurements, then minimizing the difference between the reconstructed log and the actual log can be expressed as:

$$\min \|T - R\|^2 = \min \|T - H \cdot S\|^2$$

which is the general form of equation (19). We get the value of S for the minimum of the above expression by nullifying its derivative with respect to S:

$$\frac{\partial T - H \cdot S^2}{\partial S} = 0$$

This leads to the new form of equations (20) and (21):

$$H^T H S - H^T T = 0$$

where $H^T$ is the transpose of matrix H. The solution vector S is:

$$S = (H^T h)^{-1} H^T T$$

The current $kl^{th}$ element of matrix $H^T H$ is given by:

$$[H^T H]_{kl} = \sum_i H_k(z_i) H_l(z_i) \text{ for } 1 \leq k \leq N \text{ and } 1 \leq l \leq N \quad (22)$$

The current $k^{th}$ element of vector $H^T T$ can be computed as:

$$[H^T T]_k = \sum_i H_k(z_i) t(z_i) \text{ for } 1 \leq k \leq N \quad (23)$$

5 Extension of Modal analysis to 2D response (G(r,z))

Symbols definition:

t=1, . . . , T tool index
p=1, . . . , P radial bin index
n=1, . . . , N mode index
$g^t(r_p,z_j)$ integrated geometrical factor or response function over a surface element centered on surface element $(r_p,z_j)$.
$h_{pn}(z_i)$: basis function of order n for radial bin $r_p$.
$S_{pn}^t$: tool unknown for mode n and for radial bin $r_p$. There is one set of unknown per tool.

$$r^t(z_i) = \sum_p \sum_n S_{pn}^t \sum_j g^t(r_p, z_i - z_j) h_{pn}(z_j) \quad (24)$$

For a given tool there are in general P×N unknowns to be solved for.

There are some additional assumptions or constraints:

$h_{pn}(z_i)=h_n(z_i)$ for all p values, this implies one set of basis function regardless of radial variations.

For each tool $S_{pn}^t$ can be approximated by $S_n^t$ evaluated by a 1-D MODINV with no invasion.

In impermeable zones, $S_{pn}^t$.

In practice, effect of radial variation can be assessed only with tools measuring the same physical parameter but with various depth of investigation (DIT-E Phasor Deep, Medium and SFL-E) or (LLD, LLS and MSFL) or (AIT 10', 20', 30', 60", 90" plus MSFL)

Hence, $S_{pn}^t=S_{pn}$ for all tools measuring the same parameter.

The solution is obtained by minimizing the residuals as follows:

$$\min \sum_t \sum_i [t^t(z_i) - r^t(zi)]^2 \qquad (20)$$

$$\min \left( \sum_t \sum_i [t^t(z_i) - \sum_p \sum_n S_{pn} \sum_j g^t(r_p, z_j - z_i) h_{pn}(z_j)]^2 \right) \qquad (25)$$

$$\min \left( \sum_t \sum_i [t^t(z_i) - \sum_p \sum_n S_{pn} H_{pn}^t(z_i)]^2 \right) \qquad (26)$$

6 ELAN formulation

In ELAN formation analysis, the following assumptions are made:

At every depth $z_i$ each tool responds as if it were in an homogeneous medium. F is independent of $(r,\theta,z)$ Each tool response is linearized (linear solver option) F is a linear combination of $V_j$ In order to take into account invasion (dependence in r), two zones are assumed, an invaded zone and an unperturbed zone.

Non linearity can be taken into account approximately or by using a non linear solver The response equation is:

$$T_p(z_i) = \sum_j V_j(z_i) t_{pj} \qquad (27)$$

where $t_{pj}$ is the tool response for $V_j=1$

7 RTGLOB formulation

In RTGLOB the following assumptions are made:

F is independent of $(r,\theta,z)$ except for Induction and Resistivity measurements F can be expressed as a non linear function of $V_j$ For Induction and Resistivity measurements, the response equation is:

$$T_p(z_i)=T_p(z_i)=G(r_i)T_{pze}(z_i)+[1-G(r_i)]T_{pun}(z_i) \qquad (28)$$

where:

$G(r_i)$ is the integrated radial geometrical factor up to the radius of invasion $r_i$ $T_{pze}(z_i)$ is the tool reading in the invaded zone $T_{pun}(z_i)$ is the tool reading in the unperturbed zone and $T_{pze}(z_i)$, $T_{pun}(z_i)$ are in general function of $V_j$ 8 First order Refinement on MODINV solution Let us designate by $h_{N+1}(z_i)$ the additional basis function for the additional mode N+1. $h_{N+1}(z_i)=0$ everywhere except for a specific bed.

$$r_1(z_i) = r_0(z_i) + \Delta S_{N+1} \sum_j g(z_j - z_i) h_{N+1}(z_j) \qquad (29)$$

$$r_1(z_i) = r_0(z_i) + \Delta S_{N+1} H_{N+1}(z_i) \qquad (30)$$

In order to estimate $\Delta S_{N+1}$, we will mime the $\chi^2$ residual:

$$[t(z_i) - r_1(z_i)]^2 = \min \sum_i [t(z_i) - r_0(z_i) - \Delta S_{N+1} H_{N+1}(z_i)]^2 \qquad (31)$$

$$= \min \sum_i [t(z_i) - r_0(z_i)]^2 + [\Delta S_{N+1} H_{N+1}(z_i)]^2 - \qquad (32)$$

$$2\Delta S_{N+1} H_{N+1}(z_i)[t(z_i) - r_0(z_i)]$$

which yields the following solution:

$$\Delta S_{N+1} = \frac{\sum_i H_{N+1}(z_i)[t(z_i) - r_0(z_i)]}{\sum_i H_{N+1}(z_i)^2} \qquad (33)$$

Then $$r_1(z_i) = r_0(z_i) + \frac{\sum_k H_{N+1}(z_k)[t(z_k) - r_0(z_k)]}{\sum_k H_{N+1}(z_k)^2} H_{N+1}(z_i) \qquad (34)$$

Now taking each bed at a time one can compute $r_2(z_i)$, $r_3(z_i)$, ... $r_{Nbed}(z_i)$ such that:

$$r_{nbed}(z_i) = \qquad (35)$$

$$r_{(n-1)bed}(z_i) + \frac{\sum_k H_{N+nbed}(z_k)[t(z_k) - r_{(n-1)bed}(z_k)]}{\sum_k H_{N+nbed}(z_k)^2} H_{N+nbed}(z_i)$$

9 MODINV solution constrained by a series of known beds

Very often, several beds in s given depth interval, will be of sufficient thickness for the low resolution tool under consideration to read correctly at least within the bed. The proposed method takes advantage of this new constraint to eliminate the need to compute an estimate of the bed value by MODINV, but rather to impose an additional constraint on the solution.

Suppose that for a particular bed, say the $k^{th}$ bed, we know the value of S and in addition we know that bed k belongs to the basis function $h_m(z_i)$ Let us define by $h_m^k(z_i)$, the basis function describing bed k.

We have then, $$h_m^k(z_i) h_n(z_i) = h_m^k(z_i) \qquad (36)$$

if m=n
and $$h_m^k(z_i) h_n(z_i) = 0 \qquad (37)$$

if m≠n

At this point, two strategies are possible:

The first one assures that all the bed belonging to mode m will have the same value $S_m = S_m^k$, $S_m^k$ being the true known value for bed k.

$$r(z_i) - S_m^k \sum_j g(z_j - z_i) h_m(z_j) = \sum_{n \neq m} S_n \sum_j g(z_j - z_i) h_n(z_j) \qquad (38)$$

One can easily generalized the previous equation to several known beds by subtracting from the left hand side the contribution of each corresponding mode, leaving in the right hand side the sum over the unknown modes. The dimension of the problem to solve is reduced by the number of known modes. Note there is a possible conflict if two or more beds belong to the same mode but do not have the same value.

In the second method, the total number of unknown modes is unchanged but new basis functions are calculated for the modes containing one or several known beds. For instance in the case of one unknown bed, $$h_n^{New}(z_i) = h_n^{Old}(z_i) \tag{39}$$

if $n \neq m$
and $$h_n^{New}(z_i) = \{1 - h_m^k(z_i)\} h_n^{Old}(z_i) \tag{40}$$

The remaining unknowns are estimated by solving the following equation:

$$r(z_i) - S_m^k \sum_j g(z_j - z_i) h_m^k(z_j) = \sum_n S_n \sum_j g(z_j - z_i) h_n^{New}(z_j) \tag{41}$$

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A system responsive to a high resolution log and a low resolution log developed by a well tool when said tool is disposed in a wellbore for determining a characteristic associated with each layer of a plurality of layers of a laminated formation traversed by the wellbore and illustrating the characteristics of each of the plurality of layers of the laminated formation on an output record medium, said well tool having a vertical response function, comprising:

rectangular log generation means responsive to said high resolution log for generating a rectangular deconvolved log, said rectangular log generation means including first means responsive to said high resolution log for generating a plurality of basis functions, and second means responsive to said plurality of basis functions for generating said rectangular deconvolved log in response to said basis functions, said first means including squared log generation means responsive to said high resolution log for generating a squared version of said high resolution log, locating a plurality of boundary locations on said squared version of said high resolution log, and separating said squared version of said high resolution log into a plurality of areas, each of said areas of said squared version of said high resolution log lying between a pair of said boundary locations, and multi-dimensional analysis means responsive to said squared version of said high resolution log from said squared log generation means for storing a histogram having a plurality of mode regions which correspond, respectively, to said plurality of areas of said squared version of said high resolution log, said multi-dimensional analysis means comparing said histogram disposed in each of said plurality of mode regions with the corresponding squared version of said high resolution log disposed in each of said plurality of areas and generating said plurality of basis functions in response thereto;

convolution means responsive to said rectangular deconvolved log generated by said rectangular log generation means for convolving said rectangular deconvolved log with said vertical response function of said well tool and generating a reconstructed log in response thereto;

comparator means responsive to said rectangular deconvolved log, said low resolution log, and said reconstructed log for comparing said low resolution log with said reconstructed log and passing said rectangular deconvolved log therethrough when said low resolution log is approximately equal to said reconstructed log;

volumetric analysis means for performing a volumetric analysis on said rectangular deconvolved log from said comparator means and generating a volumetric analysis; and output record generating means for generating an output record medium illustrating said rectangular deconvolved log and said volumetric analysis representative of the characteristics of each of the plurality of layers of the laminated formation, said comparator means modifying said reconstructed log in view of said low resolution log when said low resolution log is not approximately equal to said reconstructed log and generating a new rectangular deconvolved log, said convolution means convolving said new rectangular deconvolved log with said vertical response function and generating a new reconstructed log, said comparator means comparing said low resolution log with said new reconstructed log and passing said new rectangular deconvolved log therethrough when said low resolution log is approximately equal to said new reconstructed log, said volumetric analysis means performing a volumetric analysis on said new rectangular deconvolved log from said comparator means and generating a further volumetric analysis, said output record generating means generating a new output record medium illustrating said new rectangular deconvolved log and said further volumetric analysis representative of the characteristics of each of the plurality of layers of the laminated formation.

2. The system of claim 1, wherein said second means comprises:

mode inverse means responsive to said plurality of basis functions from said multi-dimensional analysis means for generating said rectangular deconvolved log $S(z_j)$ in response to said basis functions using the following equation:

$$S(z_j) = \text{SUMMATION } \{h_n(z_j) S_n\},$$

where:
$S(z_j)$ represents said rectangular deconvolved log and z represents depth in said wellbore,
$h_{n(z_j)}$ represents said plurality of basis functions, and
$S_n$ represents a set of modes corresponding, respectively, to said plurality of mode regions on said histogram stored in said multi dimensional analysis means.

3. A method practiced by a computer processor for determining a characteristic associated with each layer of a plurality of layers of a laminated formation traversed by a wellbore and illustrating the characteristics of each of the plurality of layers of the laminated formation on an output record medium in response to a high resolution log and a low resolution log developed by a well tool when said tool is disposed in said wellbore, said well tool having a vertical response function, comprising the steps of:

(a) generating a rectangular deconvolved log in response to said high resolution log, the generating step (a) of generating said rectangular deconvolved log including the steps of generating a plurality of basis functions and generating said rectangular deconvolved log from said plurality of basis functions, the step of generating a plurality of basis functions including the steps of, generating a squared version of said high resolution log in response to said high resolution log, locating a plurality of boundary locations on said squared version of said high resolution log, and separating said squared version of said high resolution log into a plurality of areas where each of said areas of said squared version of said high resolution log lie between a pair of said boundary locations, storing a histogram having a plurality of mode regions which correspond, respectively, to said plurality of areas of said squared version of said high resolution log in response to said squared version of said high resolution log, and comparing said histogram disposed in each of said plurality of mode regions with the respective squared version of said high resolution log disposed in each of said plurality of areas and generating said plurality of basis functions in response thereto;

(b) convolving said rectangular deconvolved log with said vertical response function of said well tool and generating a reconstructed log;

(c) comparing said low resolution log with said reconstructed log;

(d) passing said rectangular deconvolved log when said low resolution log is approximately equal to said reconstructed log;

(e) modifying said reconstructed log with reference to said low resolution log when said low resolution log is not approximately equal to said reconstructed log;

(f) performing a volumetric analysis on said rectangular deconvolved log when said rectangular deconvolved log is allowed to pass during the passing step (d) thereby producing a volumetric analysis;

(g) generating an output record medium illustrating said rectangular deconvolved log and said volumetric analysis representative of the characteristics of each of the plurality of layers of the laminated formation when the volumetric analysis is produced in response to the performing step (f);

(h) generating a new rectangular deconvolved log when said reconstructed log is modified during the modifying step (e);

(i) convolving said new rectangular deconvolved log generated during the generating step (h) with said vertical response function of said well tool and generating a new reconstructed log;

(j) comparing said low resolution log with said new reconstructed log produced during the convolving step (i) and passing said new rectangular deconvolved log when said low resolution log is approximately equal to said new reconstructed log;

(k) performing said volumetric analysis on said new rectangular deconvolved log passed in response to the passing step (j) thereby producing a further volumetric analysis; and (l) generating a new output record medium illustrating said new rectangular deconvolved log and said further volumetric analysis representative of the characteristics of each of the plurality of layers of the laminated formation.

4. The method of claim 3, wherein the step of generating said rectangular deconvolved log from said plurality of basis functions generated during the generating step (a) comprises the steps of:

generating said rectangular deconvolved log $S(z_j)$ in response to said plurality of basis functions using the following equation:

$$S(z_j) = \text{SUMMATION } [h_n(z_j) S_n],$$

where, $S(z_j)$ represents said rectangular deconvolved log and z represents depth in said wellbore, $h_n(z_j)$ represents said plurality of basis functions, and $S_n$ represents a set of modes corresponding, respectively, to said plurality of mode regions on said histogram stored during the storing step of the generating step (a).

5. A workstation based system responsive to a high resolution log and a low resolution log developed by a well tool when said tool is disposed in a wellbore for determining a characteristic associated with each layer of a plurality of layers of a laminated formation traversed by the wellbore and illustrating the characteristics of each of the plurality of layers of the laminated formation on an output log, said well tool having a vertical response function, comprising:

rectangular log generation means responsive to said high resolution log for generating a rectangular deconvolved log, said rectangular log generation means including first means responsive to said high resolution log for generating a plurality of basis functions, and second means responsive to said plurality of basis functions for generating said rectangular deconvolved log in response to said basis functions, said first means including squared log generation means responsive to said high resolution log for generating a squared version of said high resolution log, locating a plurality of boundary locations on said squared version of said high resolution log, and separating said squared version of said high resolution log into a plurality of areas, each of said areas of said squared version of said high resolution log lying between a pair of said boundary locations, and multi-dimensional analysis means responsive to said squared version of said high resolution log from said squared log generation means for storing a histogram having a plurality of mode regions which correspond, respectively, to said plurality of areas of said squared version of said high resolution log, said multi-dimensional analysis means comparing said histogram disposed in each of said plurality of mode regions with the corresponding squared version of said high resolution log disposed in each of said plurality of areas and generating said plurality of basis functions in response thereto;

convolution means responsive to said rectangular deconvolved log generated by said rectangular log generation means for convolving said rectangular deconvolved log with said vertical response function of said well tool and generating a reconstructed log in response thereto;

comparator means responsive to said rectangular deconvolved log, said low resolution log, and said reconstructed log for comparing said low resolution log with said reconstructed log and passing said rectangular deconvolved log when said low resolution log is approximately equal to said reconstructed log, said comparator means modifying said reconstructed log and generating a new rectangular deconvolved log when said low resolution log is not approximately equal to said reconstructed log;

volumetric analysis means for performing a volumetric analysis on said rectangular deconvolved log passed by said comparator means and generating a volumetric analysis; and output log generating means for generating an output log illustrating said rectangular deconvolved log and said volumetric analysis representative of the characteristics of each of the plurality of layers of the laminated formation, said convolution means convolving said new rectangular deconvolved log with said vertical response function and generating a new reconstructed log, said comparator means comparing said low resolution log with said new reconstructed log and passing said new rectangular deconvolved log when said low resolution log is approximately equal to said new reconstructed log, said volumetric analysis means performing a volumetric analysis on said new rectangular deconvolved log from said comparator means and generating a further volumetric analysis, said output log generating means generating a new output log illustrating said new rectangular deconvolved log and said further volumetric analysis representative of the characteristics of each of the plurality of layers of the laminated formation.

6. The workstation based system of claim 5, wherein said second means comprises:

mode inverse means responsive to said plurality of basis functions from said multi-dimensional analysis means for generating said rectangular deconvolved log $S(z_j)$ in response to said basis functions using the following equation:

$$S(z_j) = \text{SUMMATION } [h_n(z_j)S_n],$$

where:
$S(z_j)$ represents said rectangular deconvolved log and z represents depth in said wellbore,
$hn(z_j)$ represents said plurality of basis functions, and
$S_n$ represents a set of modes corresponding, respectively, to said plurality of mode regions on said histogram stored in said multi dimensional analysis means.

7. A system responsive to a low resolution log developed by a well tool when said tool is disposed in a wellbore for determining a characteristic associated with each layer of a plurality of layers of a laminated formation traversed by the wellbore and illustrating the characteristics of each of the plurality of layers of the laminated formation on an output record medium, said well tool having a vertical response function, comprising:

means for generating a high resolution log;

rectangular log generation means responsive to said high resolution log for generating a rectangular deconvolved log, said rectangular log generation means including, first means responsive to said high resolution log for generating a plurality of basis functions, and second means responsive to said plurality of basis functions for generating said rectangular deconvolved log in response to said basis functions, said first means including, squared log generation means responsive to said high resolution log for generating a squared version of said high resolution log, locating a plurality of boundary locations on said squared version of said high resolution log, and separating said squared version of said high resolution log into a plurality of areas, each of said areas of said squared version of said high resolution log lying between a pair of said boundary locations, and multi-dimensional analysis means responsive to said squared version of said high resolution log from said squared log generation means for storing a histogram having a plurality of mode regions which correspond, respectively, to said plurality of areas of said squared version of said high resolution log, said multi-dimensional analysis means comparing said histogram disposed in each of said plurality of mode regions with the corresponding squared version of said high resolution log disposed in each of said plurality of areas and generating said plurality of basis functions in response thereto;

convolution means responsive to said rectangular deconvolved log generated by said rectangular log generation means for convolving said rectangular deconvolved log with said vertical response function of said well tool and generating a reconstructed log in response thereto;

comparator means including means for employing a manual interaction with a human operator responsive to said rectangular deconvolved log, said low resolution log, and said reconstructed log for comparing, by said human operator, said low resolution log with said reconstructed log, said human operator of said comparator means passing said rectangular deconvolved log when said low resolution log is approximately equal to said reconstructed log;

volumetric analysis means for performing a volumetric analysis on said rectangular deconvolved log from said comparator means and generating a volumetric analysis; and output record generating means for generating an output record medium illustrating said rectangular deconvolved log and said volumetric analysis representative of the characteristics of each of the plurality of layers of the laminated formation, said human operator of said comparator means modifying said reconstructed log in view of said low resolution log when said low resolution log is not approximately equal to said reconstructed log and generating a new rectangular deconvolved log, said convolution means convolving said new rectangular deconvolved log with said vertical response function and generating a new reconstructed log, said human operator of said comparator means comparing said low resolution log with said new reconstructed log and passing said new rectangular deconvolved log when said low resolution log is approximately equal to said new reconstructed log, said volumetric analysis means performing a volumetric analysis on said new rectangular deconvolved log from said comparator means and generating a further volumetric analysis, said output record generating means generating a new output record medium illustrating said new rectangular deconvolved log and said further volumetric analysis representative of the characteristics of each of the plurality of layers of the laminated formation.

8. The system of claim 7, wherein said second means comprises:

mode inverse means responsive to said plurality of basis functions from said multi-dimensional analysis means for generating said rectangular deconvolved log $S(z_j)$ in response to said basis functions using the following equation:

$$S(z_j) = \text{SUMMATION } [h_n(z_j)S_n],$$

where:

$S(z_j)$ represents said rectangular deconvolved log and z represents depth in said wellbore, $h_n(z_j)$ represents said plurality of basis functions, and $S_n$ represents a set of modes corresponding, respectively, to said plurality of mode regions on said histogram stored in said multi dimensional analysis means.

9. A method practiced by a computer processor for determining a characteristic associated with each layer of a plurality of layers of a laminated formation traversed by a wellbore and illustrating the characteristics of each of the plurality of layers of the laminated formation on an output record medium in response to a low resolution log developed by a well tool when said tool is disposed in said wellbore, said well tool having a vertical response function, comprising the steps of:

(a) producing a high resolution log and then generating a rectangular deconvolved log in response to said high resolution log, the step of generating said rectangular deconvolved log of step (a) including the steps of, generating a plurality of basis functions and generating said rectangular deconvolved log from said plurality of basis functions, the generating step of generating a plurality of basis functions including the steps of, generating a squared version of said high resolution log in response to said high resolution log, locating a plurality of boundary locations on said squared version of said high resolution log, and separating said squared version of said high resolution log into a plurality of areas where each of said areas of said squared version of said high resolution log lie between a pair of said boundary locations, storing a histogram having a plurality of mode regions which correspond, respectively, to said plurality of areas of said squared version of said high resolution log in response to said squared version of said high resolution log, and comparing said histogram disposed in each of said plurality of mode regions with the respective squared version of said high resolution log disposed in each of said plurality of areas and generating said plurality of basis functions in response thereto; and (b) convolving said rectangular deconvolved log with said vertical response function of said well tool and generating a reconstructed log;

(c) comparing said low resolution log with said reconstructed log;

(d) passing said rectangular deconvolved log when said low resolution log is approximately equal to said reconstructed log, the comparing step (c) and the passing step (d) employing a manual interaction with a human operator to perform the comparing step (c) and the passing step (d);

(e) modifying said reconstructed log with reference to said low resolution log when said low resolution log is not approximately equal to said reconstructed log, the modifying step (e) including employing said manual interaction with said human operator to perform the modifying step (e);

(f) performing a volumetric analysis on said rectangular deconvolved log when said rectangular deconvolved log is allowed to pass during the passing step (d) thereby producing a volumetric analysis;

(g) generating an output record medium illustrating said rectangular deconvolved log and said volumetric analysis representative of the characteristics of each of the plurality of layers of the laminated formation when the volumetric analysis is produced in response to the performing step (f);

(h) generating a new rectangular deconvolved log when said reconstructed log is modified during the modifying step (e);

(i) convolving said new rectangular deconvolved log generated during the generating step (h) with said vertical response function of said well tool and generating a new reconstructed log;

(j) comparing said low resolution log with said new reconstructed log produced during the convolving step (i) and passing said new rectangular deconvolved log when said low resolution log is approximately equal to said new reconstructed log, the comparing and passing step (j) including employing said manual interaction with said human operator to perform the comparing and passing step (j);

(k) performing said volumetric analysis on said new rectangular deconvolved log passed in response to the passing step (j) thereby producing a further volumetric analysis; and (l) generating a new output record medium illustrating said new rectangular deconvolved log and said further volumetric analysis representative of the characteristics of each of the plurality of layers of the laminated formation.

10. The method of claim 9, wherein the generating step of generating said rectangular deconvolved log from said plurality of basis functions comprises the steps of:

generating said rectangular deconvolved log $S(z_j)$ in response to said plurality of basis functions using the following equation:

$$S(z_j) = \text{SUMMATION } [h_n(z_j)S_n],$$

where, $S(z_j)$ represents said rectangular deconvolved log, $h_n(z_j)$ represents said plurality of basis functions, and $S_n$ represents a set of modes corresponding, respectively, to said plurality of mode regions on said histogram stored during the storing step.

11. A workstation based system responsive to a low resolution log developed by a well tool when said tool is disposed in a wellbore for determining a characteristic associated with each layer of a plurality of layers of a laminated formation traversed by the wellbore and illustrating the characteristics of each of the plurality of layers of the laminated formation on an output log, said well tool having a vertical response function, comprising:

means for generating a high resolution log;

rectangular log generation means responsive to said high resolution log for generating a rectangular deconvolved log, said rectangular log generation means including first means responsive to said high resolution log for generating a plurality of basis functions and second means responsive to said plurality of basis functions for generating said rectangular deconvolved log in response to said basis functions, said first means including squared log generation means responsive to said high resolution log for generating a squared version of said high resolution log, locating a plurality of boundary locations on said squared version of said high resolution log, and separating said squared version of said high resolution log into a plurality of areas, each of said areas of said squared version of said high resolution log lying between a pair of said boundary locations, and multi-dimensional analysis means responsive to said squared version of said high resolution log from said squared log generation means for storing a histogram having a plurality of mode regions which correspond, respectively, to said plurality of areas of said squared version of said high resolution log, said multi-dimensional analysis means comparing said histogram disposed in each of said plurality of mode regions with the corresponding squared version of said high resolution log disposed in each of said plurality of areas and generating said plurality of basis functions in response thereto;

convolution means responsive to said rectangular deconvolved log generated by said rectangular log generation means for convolving said rectangular deconvolved log with said vertical response function of said well tool and generating a reconstructed log in response thereto;

comparator means including means for employing a manual interaction with a human operator responsive to said rectangular deconvolved log, said low resolution log, and said reconstructed log for comparing said low resolution log with said reconstructed log and passing said rectangular deconvolved log therethrough when said low resolution log is approximately equal to said reconstructed log, said means for employing of said comparator means modifying said reconstructed log and generating a new rectangular deconvolved log when said low resolution log is not approximately equal to said reconstructed log;

volumetric analysis means for performing a volumetric analysis on said rectangular deconvolved log passed by said comparator means and generating a volumetric analysis; and output log generating means for generating an output log illustrating said rectangular deconvolved log and said volumetric analysis representative of the characteristics of each of the plurality of layers of the laminated formation, said convolution means convolving said new rectangular deconvolved log with said vertical response function and generating a new reconstructed log, said means for employing of said comparator means comparing said low resolution log with said new reconstructed log and passing said new rectangular deconvolved log therethrough when said low resolution log is approximately equal to said new reconstructed log, said volumetric analysis means performing a volumetric analysis on said new rectangular deconvolved log from said comparator means and generating a further volumetric analysis, said output log generating means generating a new output log illustrating said new rectangular deconvolved log and said further volumetric analysis representative of the characteristics of each of the plurality of layers of the laminated formation.

12. The workstation based system of claim 11, wherein said second means comprises:

mode inverse means responsive to said plurality of basis functions from said multi-dimensional analysis means for generating said rectangular deconvolved log $S(z_j)$ in response to said basis functions using the following equation:

$$S(z_j) = \text{SUMMATION}[h_n(z_j) S_n],$$

where:

$S(z_j)$ represents said rectangular deconvolved log and z represents depth in said wellbore, $h_n(z_j)$ represents said plurality of basis functions, and $S_n$ represents a set of modes corresponding, respectively, to said plurality of mode regions on said histogram stored in said multi dimensional analysis means.

* * * * *